United States Patent [19]

Jesensky et al.

[11] 3,953,123
[45] Apr. 27, 1976

[54] TRANSPORT APPARATUS FOR AN AUTOMATIC MICRO-IMAGE VIEWER PRINTER MACHINE

[75] Inventors: Alexander Jesensky, Barrington; Kenneth J. Fedesna, Des Plaines; Thomas V. De Ryke, Libertyville, all of Ill.

[73] Assignee: Addressograph Multigraph Corporation, Cleveland, Ohio

[22] Filed: Jan. 30, 1975

[21] Appl. No.: 545,392

[52] U.S. Cl. .................................... 355/45; 355/53; 355/54
[51] Int. Cl.² .................. G03B 13/28; G03B 27/42; G03B 27/44
[58] Field of Search .................. 355/45, 53, 54, 64, 355/7

[56] References Cited
UNITED STATES PATENTS

| | | | |
|---|---|---|---|
| 3,639,059 | 2/1972 | Strumor et al. | 355/53 X |
| 3,740,136 | 6/1973 | Maloney et al. | 355/45 X |
| 3,784,303 | 1/1974 | Sullivan, Jr. et al. | 355/53 X |

*Primary Examiner*—Richard A. Wintercorn
*Attorney, Agent, or Firm*—Mason, Kolehmainen, Rathburn & Wyss

[57] ABSTRACT

A transport mechanism for successively positioning micro-images disposed on one of two elongated film cards in an illumination path of a viewer printer machine includes a carriage assembly moveable between first and second positions in a first direction of travel having mounted thereon a film holder assembly moveable in a second direction of travel angularly disposed with respect to said first direction of travel. First independently actuable apparatus is provided for transporting the carriage assembly between first and second positions to align one of the elongated film cards in the illumination path, and second independently actuable apparatus is provided for incrementally transporting the holder to successively align the micro-images on one of the film cards in the illumination path. The first transporting apparatus utilizes an electric drive motor for transporting the film holder from its first position to its second position, and a spring motor to return the film holder to its first position upon deenergization of the electric motor. An electric clutch is employed for coupling the film holder to the electric motor, the clutch being disengageable upon deenergization of the electric motor to reduce the drag on the spring motor. The second transporting apparatus utilizes an elongated slotted rack and a motor driven rotatable disc having pins disposed thereon for engaging the slots in the rack and incrementally transporting the carriage upon rotation of the disc. A second electric motor is mechanically coupled to the holder by a slip clutch to provide a preloading force between the rack and the pins and for returning the holder to a predetermined position upon the disengagement of the rack and the pins. Remote vernier adjustment of the position of the holder is provided to permit accurate centering of each micro-image within the illumination path, and a three dimensional adjustment of the illumination source is provided. Logic circuitry is provided to control the operation of the first and second transporting apparatus to permit the alignment of a predetermined one of the micro-images within the illumination path, or to provide sequential alignment of the micro-images of one or both of the film cards within the illumination path.

35 Claims, 34 Drawing Figures

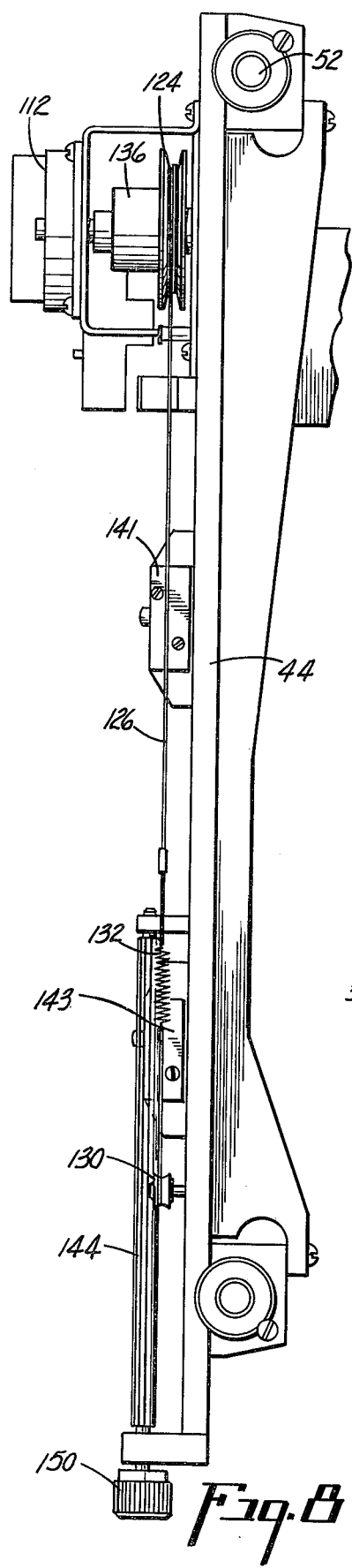
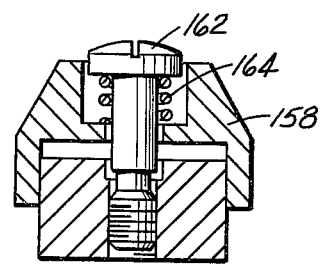
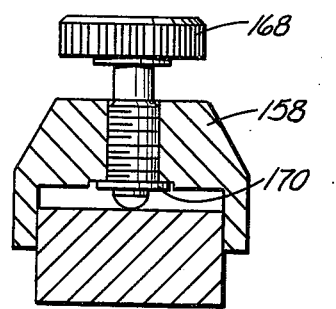
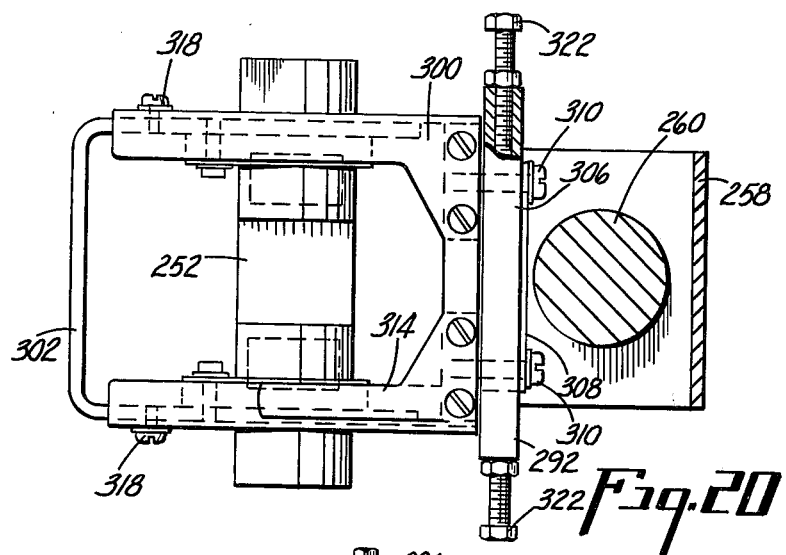
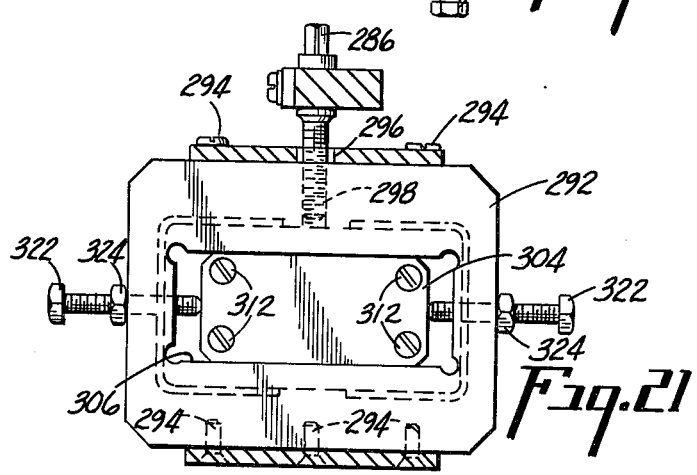

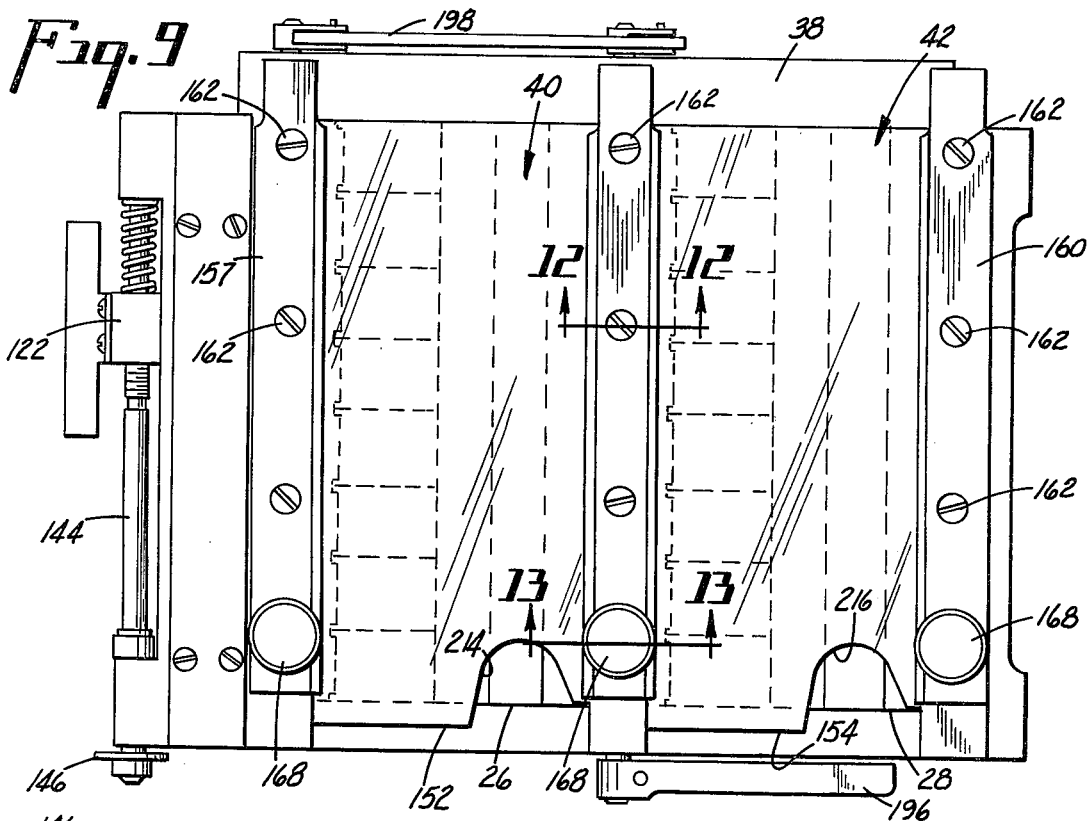
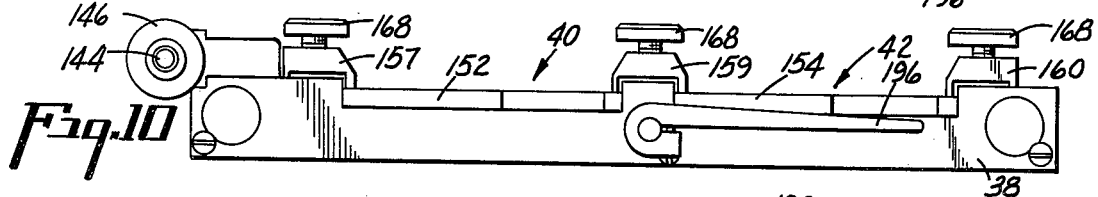
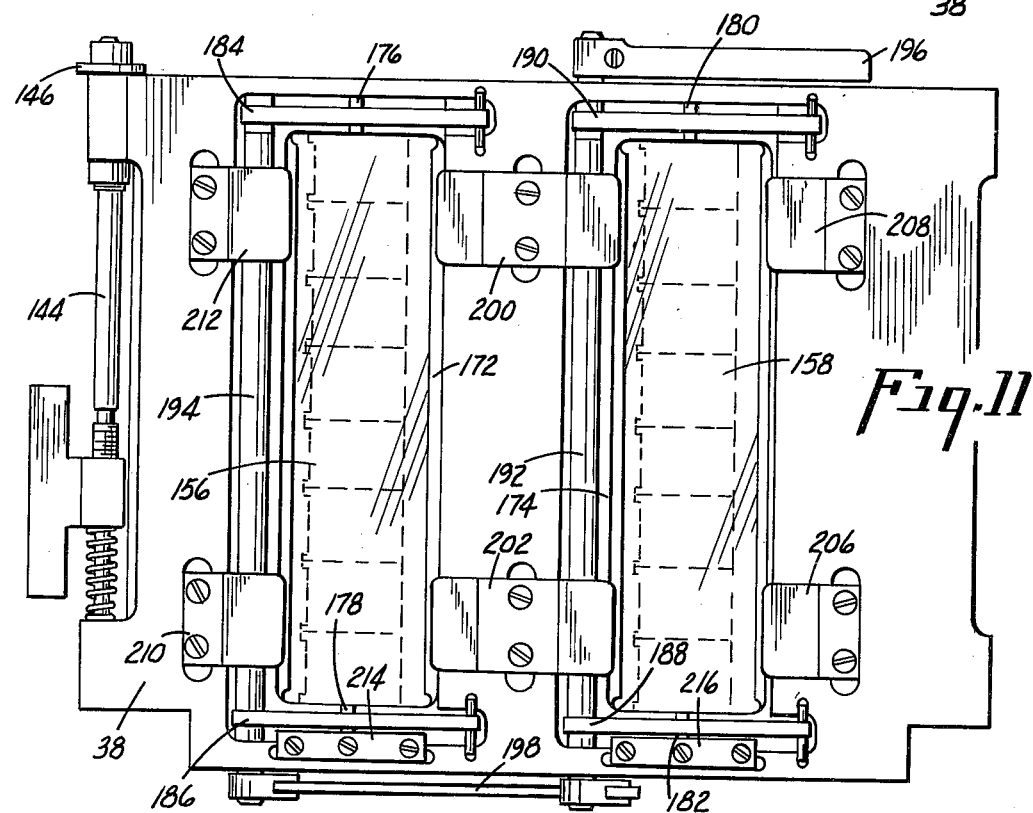

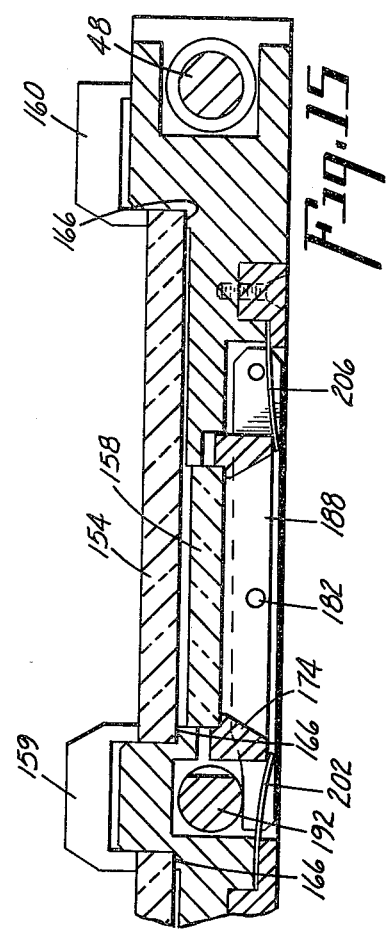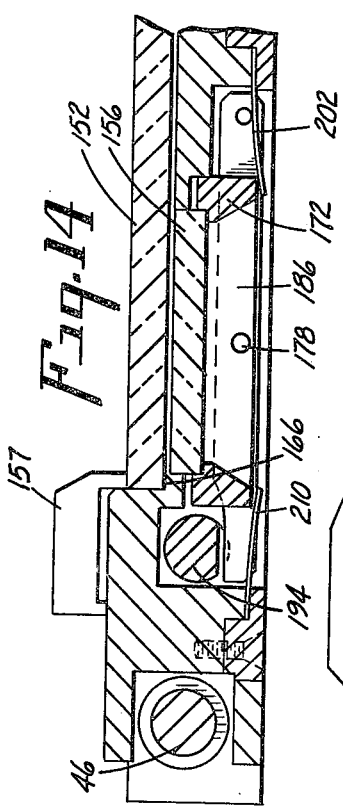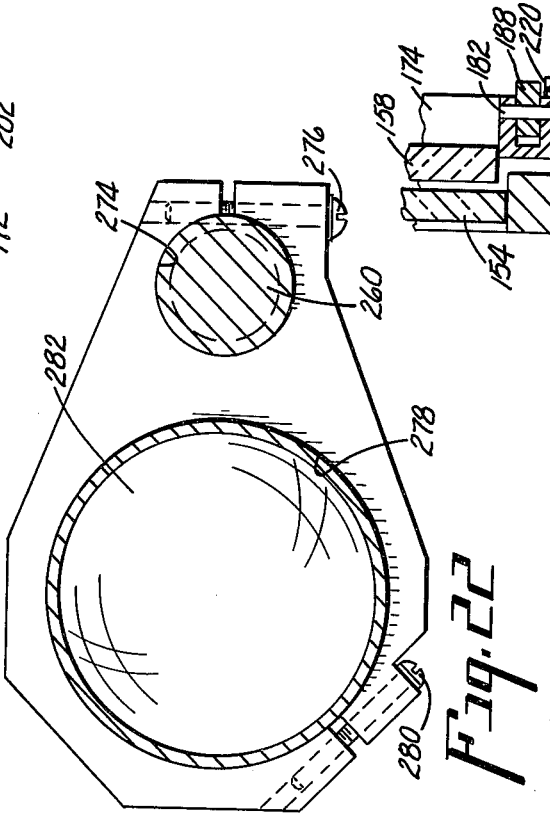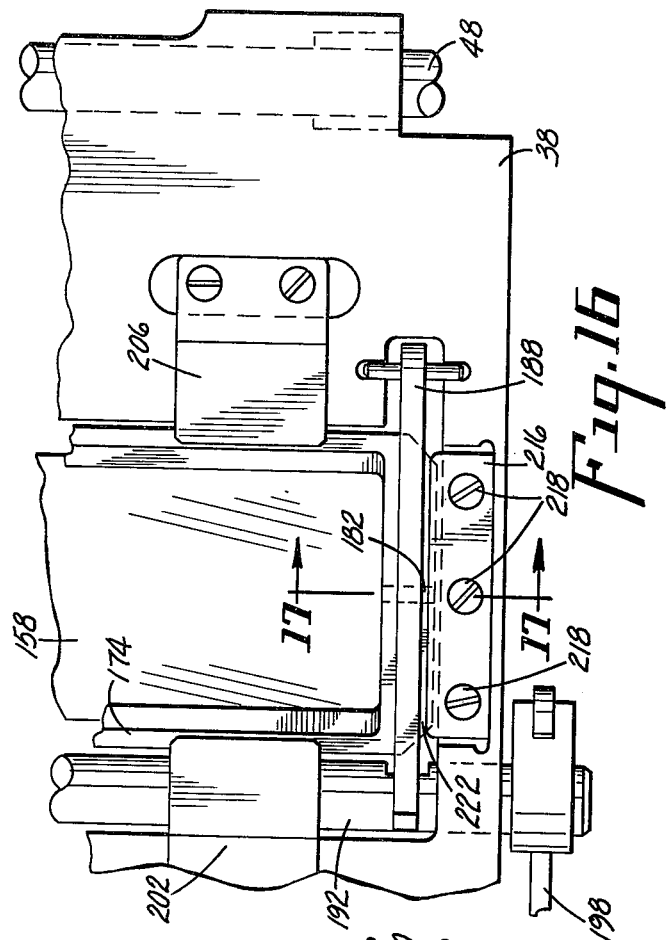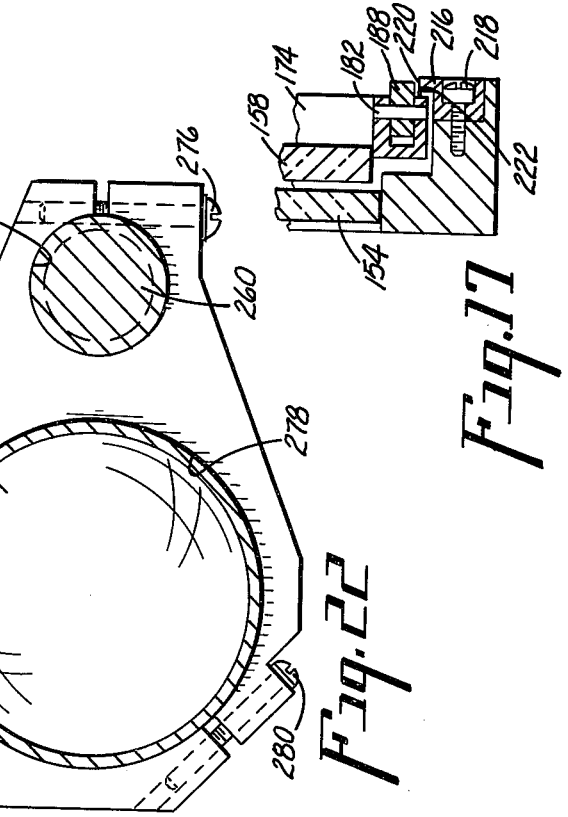

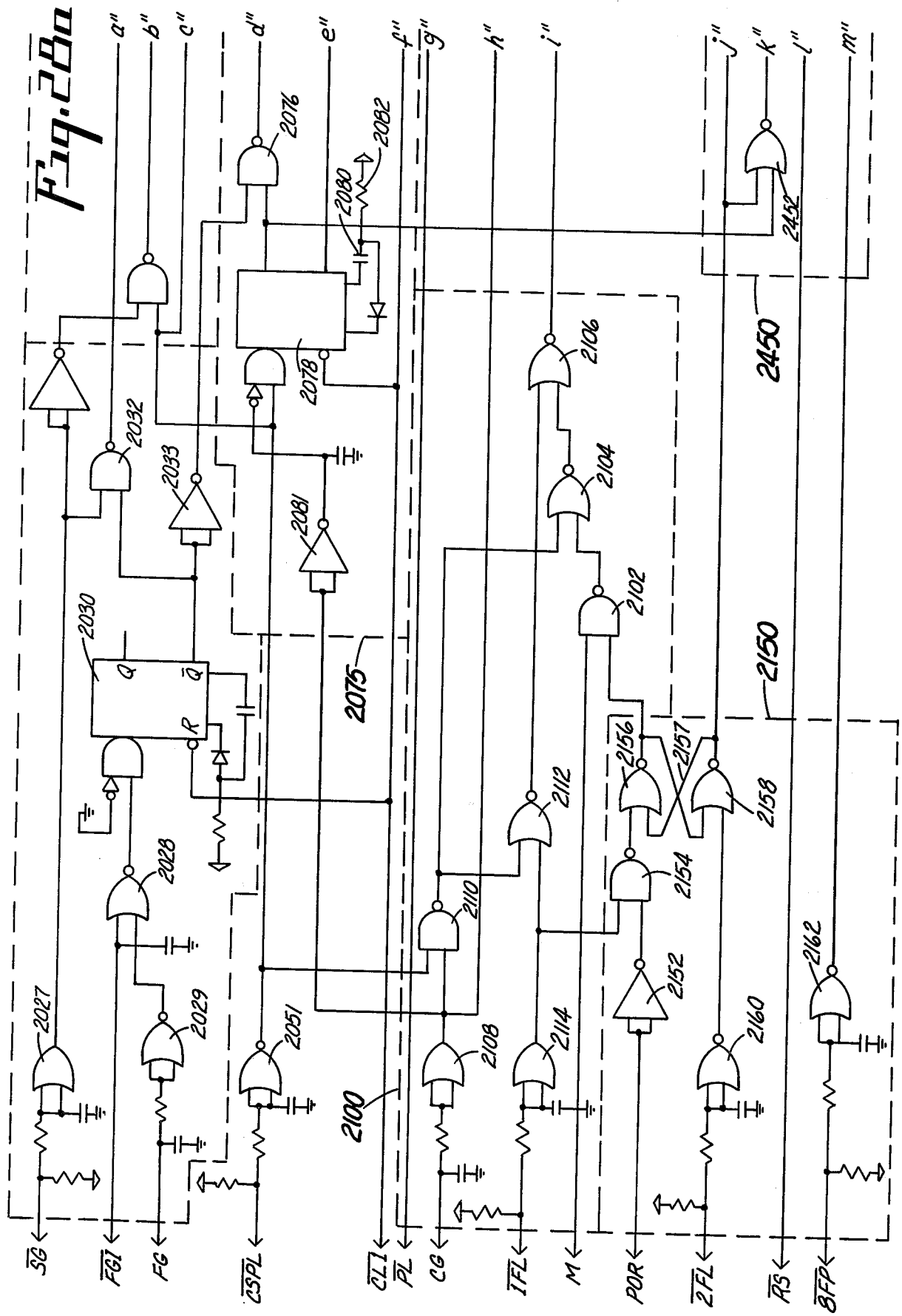

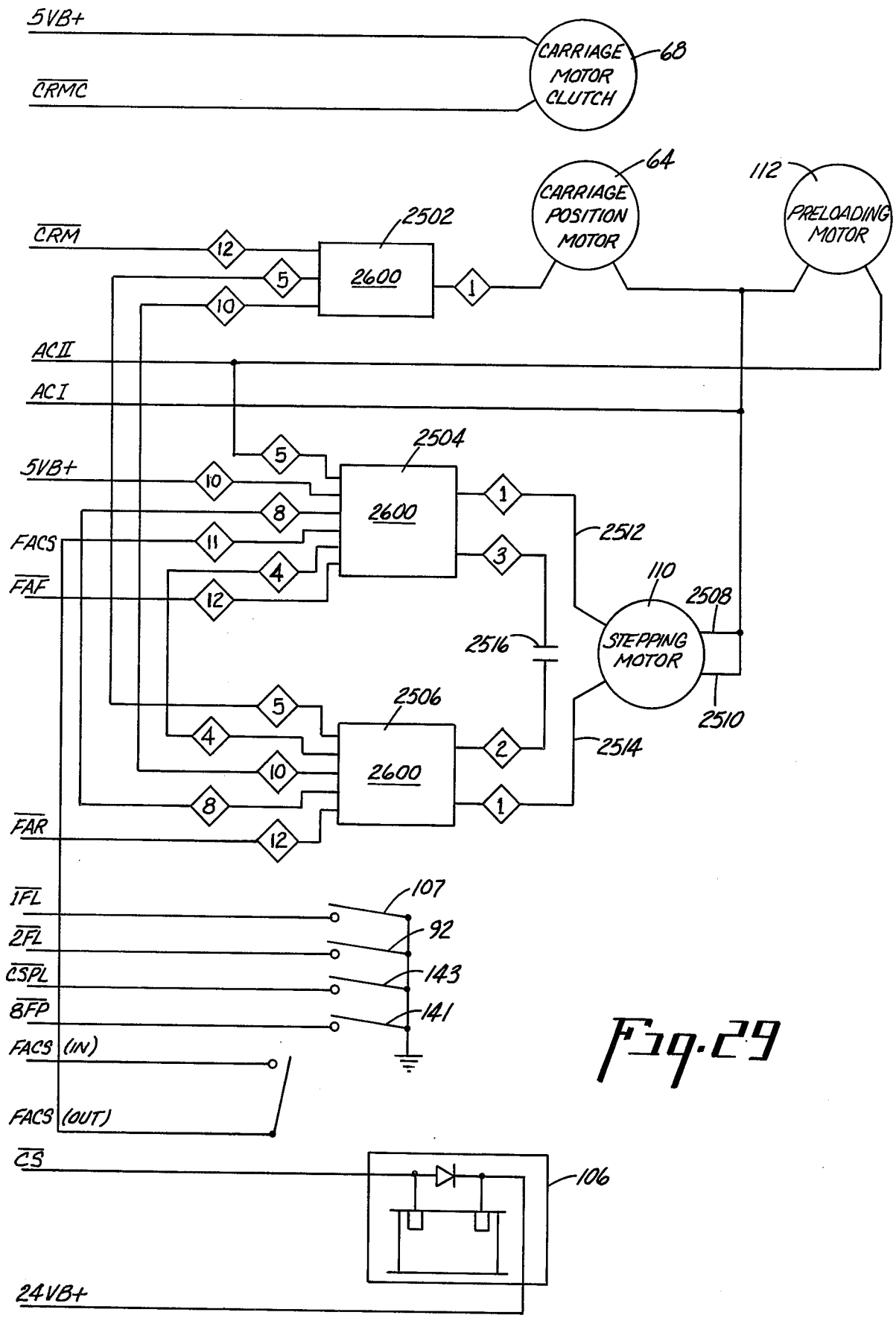

TRANSPORT APPARATUS FOR AN AUTOMATIC MICRO-IMAGE VIEWER PRINTER MACHINE

BACKGROUND OF THE INVENTION

1. Field of the Invention

This invention relates generally to a transport assembly for transporting micro-images, and more specifically to a new and improved transport assembly for transporting a variable number of micro-images located on multiple film cards through the illumination path of a viewer printer machine in a predetermined sequence.

2. Description of the Prior Art

Many devices have been provided for positioning or locating micro-images in a predetermined position in an illumination path. For example, in apparatus for viewing and printing images stored on microfiche cards, it is normally necessary to position a micro-image disposed on the microfiche card in an illumination path of the apparatus. Microfiche cards generally have a predetermined format, and the transport mechanism is programmed sequentially to position the micro-images on the microfiche card within the illumination path of the machine in a predetermined sequence in accordance with the layout format of the microfiche card. One such transport assembly is described in U.S. patent application Ser. No. 389,025 filed Aug. 16, 1973 by Joseph Goebel, now U.S. Pat. Noo. 3,870,413 issued Mar. 11, 1975 and assigned to the same assignee as the assignee of the present invention.

Whereas the prior art systems do provide apparatus for successively positioning micro-images disposed on a microfiche card in an illumination path, in practice, the length of documents stored in micro-image form varies considerably, and consequently, the document must be stored on one or more film cards, depending on its length. For example, United States Patents are stored in micro-image form in either one or two (or more) film cards depending on the length of the patent. Consequently, it is desirable to provide a transport mechanism capable of sequentially positioning the micro-images disposed on one or more film cards within a viewer printer machine to permit all of the micro-images comprising the document to be sequentially scanned regardless of the number of micro-images comprising the document and whether the micro-images are disposed on one or more film cards.

SUMMARY OF THE INVENTION

An object of the present invention is to provide a new and improved transport assembly.

Another object of the present invention is to provide a new and improved transport assembly for transporting micro-images disposed on one or more film cards.

Another object of the present invention is to provide a new and improved transport assembly for sequentially transporting micro-images disposed on one or more film cards regardless of the number of such images transported and the number of cards utilized to record such micro-images.

Briefly, the device of the present invention comprises a transport assembly having a multiple film card film holder and apparatus for controlling the relative movement of the film cards in an illumination path of a viewer printer machine. The device of the present invention includes a drive assembly having an elongated rack, a plurality of slots disposed on the rack, a plurality of drive pins releasably engageable with the rack for incrementally positioning the micro-images disposed on one of the film strips within the illumination path. An electrically operated return motor is mechanically coupled to the film holder by coupling apparatus including a slip clutch. The electric motor provides a preloading force between the rack and the pins to assure accurate positioning of each micro-image within the illumination path, and further serves to return the film holder to a predetermined position upon disengagement of the rack and the pins. A second electrically driven motor is utilized to move the carriage in a second path of travel to align different ones of the film cards in the path of travel to permit the micro-images on the film card thus aligned to be sequentially disposed within the illumination path by the rack and pin driving mechanism. A spring motor is coupled to the carriage for returning the carriage to a predetermined initial position upon actuation of a release solenoid and the deenergization of the second drive motor and an electromagnetic clutch used to couple the second drive motor to the carriage.

To provide a more accurate alignment of each micro-image within the illumination path, a remote vernier adjusting mechanism is utilized to adjust the position of the film holder, and an adjusting mechanism is provided to adjust the relative position of the illumination source in three mutually perpendicular directions with respect to the film card holder. Electronic control logic is provided to permit the transport mechanism to be programmed sequentially to scan the micro-images disposed on a single film card; sequentially to scan the images disposed on more than one film card; sequentially to scan the images disposed on a first film card and then sequentially to scan the images disposed on a second film card; and to align a single predetermined one of the micro-images in the illumination path.

BRIEF DESCRIPTION OF THE DRAWINGS

The above and other objects and advantages and novel features of the present invention will become apparent from the following detailed description of a preferred embodiment of the invention illustrated in the accompanying drawings, wherein:

FIG. 8 is a side view of the carriage assembly taken along line 8—8 of FIG. 7 and further showing the film holder assembly mounted thereon;

FIG. 9 is a top plan view showing the film holder assembly in greater detail, and further showing the positioning of the film cards, similar to those shown in FIG. 2, within the film holder assembly;

FIG. 10 is a detailed front view of the film holder assembly shown in FIG. 9;

FIG. 11 is a detailed bottom view of the film holder assembly shown in FIGS. 9 and 10;

FIG. 12 is a detailed partial sectional view of the film card holder taken along the line 12—12 of FIG. 9 showing the retaining mechanism for retaining a pair of glass film card supporting plates within the film holder assembly;

FIG. 13 is a detailed sectional view of a portion of the film holder assembly taken along the line 13—13 of FIG. 9 showing the release mechanism for releasing the film retaining glass plates from the film holder assembly;

FIG. 14 is a simplified front sectional view of the film holder assembly included to illustrate the operation of the card retaining mechanism and showing the film card retaining mechanism in a closed position for retaining the film card in position;

FIG. 15 is a front sectional view of the film card holder assembly, similar to FIG. 14, showing the film card retaining mechanism in an open position to permit the withdrawal of the film card;

FIG. 16 is a detailed bottom view of a portion of the film card holder assembly shown in FIG. 11 showing a portion of the film card retaining mechanism and the mechanism employed to retain the lower glass supporting plate;

FIG. 17 is a detailed sectional view of the film card holder assembly taken along line 17—17 of FIG. 16;

FIG. 20 is a top sectional view of the illumination source taken along line 20—20 of FIG. 19 showing an adjustment screw for adjusting the position of the illumination source along a first axis;

FIG. 21 is a side view of the illumination source taken along line 21—21 of FIG. 19 showing an adjusting mechanism for adjusting the position of the light illumination source along a second axis perpendicular to the first axis;

FIG. 22 is a top sectional view of a supporting member for the illumination source taken along line 22—22 of FIG. 19 and showing the adjusting mechanism for adjusting the position of the light illumination source along a third axis perpendicular to the first and second axes;

FIGS. 28a and 28b are detailed circuit diagrams of the carriage stepping circuit block of FIG. 24;

FIG. 29 is a detailed schematic and block diagram of the carriage and carriage control circuit block of FIG. 24;

DETAILED DESCRIPTION OF THE INVENTION

A. General

Figure 1:
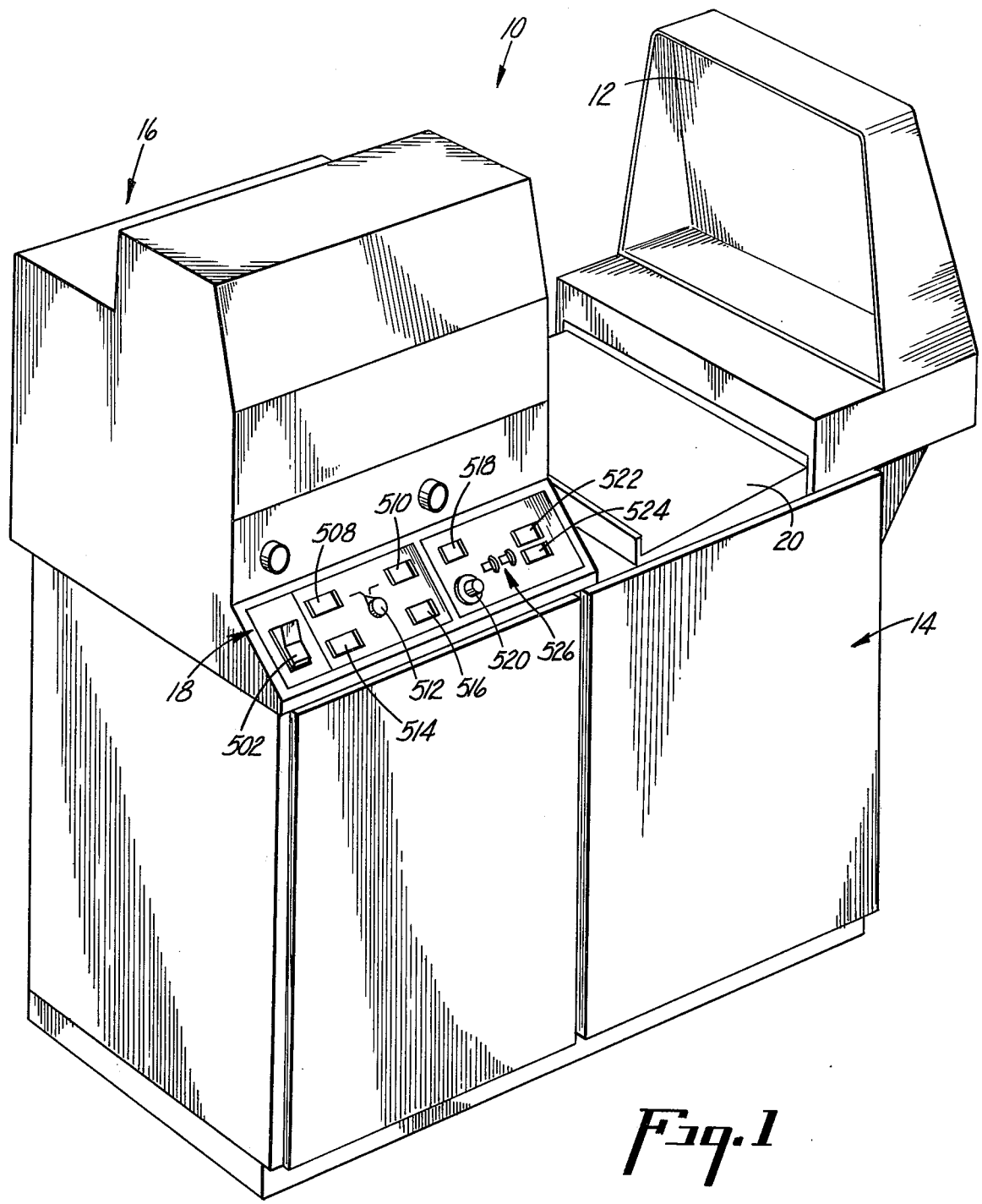
FIG. 1 is a perspective drawing of a micro-image viewer printer machine utilizing the transport mechanism according to the invention.

Referring to the drawings, and initially to FIG. 1, there is illustrated a preferred embodiment of a new and improved micro-image viewer printer machine 10, constructed in accordance with the principles of the present invention. The machine 10 enables the selective viewing or rapid reproduction of micro-images stored on film cards. The machine 10 may be programmed for various modes of operation. In its various modes, the machine 10 permits the rapid reproduction of a preselected number of copies of a predetermined one of a plurality of micro-images stored on one of a plurality of film cards; the reproduction of a preselectable number of collated sets of a predetermined number of consecutive microimages stored on one or more film cards; and the reproduction of a preselectable number of collated sets from the microimages stored on a first film card followed by the reproduction of a preselectable number of collated sets from a second film card.

The machine 10 includes a viewing or display screen 12 for receiving projected images of the micro-images stored on the film cards for viewing and study by an operator. The machine 10 further includes a printing or reproduction assembly 14, an optics and transport section 16, a control panel 18 and a tray 20 for receiving paper copies of the micro-images stored on the film cards. The viewing screen 12, the reproduction assembly 14 and the tray 20 are similar to the respective components of the microfiche viewer printer machine described in the previously mentioned Goebel patent application Ser. No. 389,025, filed Aug. 16, 1973, now U.S. Pat. No. 3,870,413, issued Mar. 11, 1975 incorporated herein by reference.

In accordance with an important aspect of the present invention, the optics and transport section 16 includes an optics assembly 22 (FIG. 3) for selectively projecting images of the micro-images stored on one or both of two film cards to the viewing screen 12 or to the printing and reproduction assembly 14. The optics and transport section 16 further includes a novel transport assembly 24 for moving the micro-images stored on microfilm cards through the illumination path of the optics assembly 22.

Figure 2:
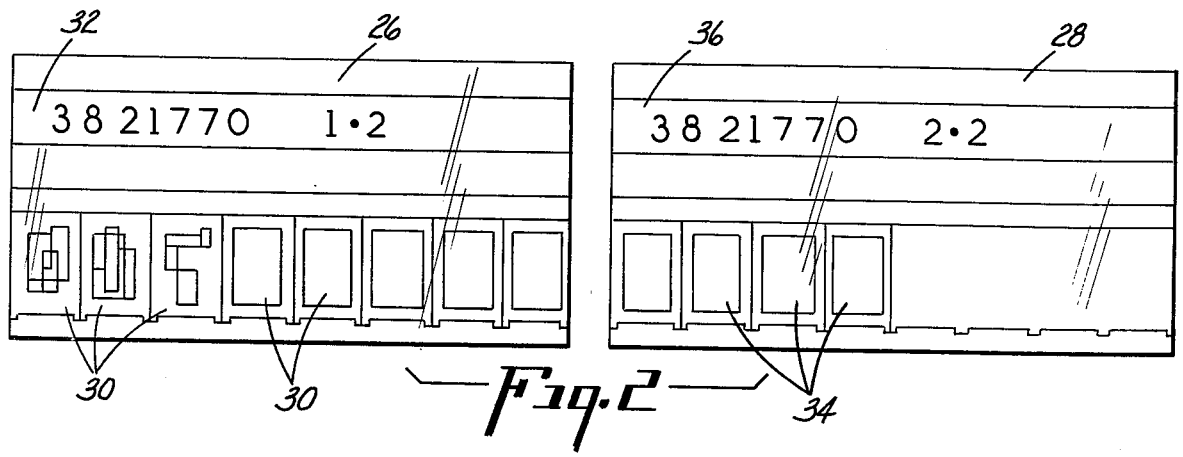
FIG. 2 is a top plan view of two micro-image film cards usable with the machine of FIG. 1 showing the format of the micro-images disposed on the film card.

In accordance with an important feature of the present invention, the machine 10 is capable of selectively displaying or automatically and rapidly reproducing microimages stored on one or more microfilm cards 26 and 28 of the type shown in FIG. 2. The microfilm cards 26 and 28 are layed out in a format similar to the format used by the U.S. Patent Office for storing micro-image reproductions of U.S. patents. The film card 26 contains eight linearly disposed micro-images 30 and an identification area 32 indicating the contents or subject matter of the stored micro-images. For example, for Patent Office use, eight micro-images are employed because the average patent has a length of eight pages. The patent number of the patent stored on the film card 26 is displayed in the identification area 32. If the patent thus stored contains more than eight pages, the remaining pages may be stored on the second film card 28 as micro-images 34. In such a case, the patent number is located in the identification area 36 of the card 28 followed by the indication 2—2 indicating that the film card 28 has stored thereon the remainder of the patent stored on the card 26. Similarly, for reasons of identification, the card 26 is provided with the symbol 1–2 in the area 32 to indicate that it is the first of a two card set containing the patent having the number illustrated in the area 32.

Because of the variable length of the documents that can be stored on the film cards 26 and 28 (patents in the example described) the machine 10 must be capable of sequentially reproducing the images stored on a single one of the cards 26 and 28 when the document contains eight pages or less, and for sequentially reproducing the images stored on both of the cards 26 and 28 if the length of the document extends beyond eight pages, if collated copies are desired. Furthermore, the machine 10 must be programmable to permit the sequential reproduction of documents regardless of the number of pages contained therein and regardless of whether the document is stored on one or more than one film card.

B. Mechanical Aspects

1. Carriage Assembly

The transport mechanism 24 (FIG. 3) is provided with a film card holder assembly 38 having a pair of film card holders 40 and 42 adapted for simultaneously holding a first and second film card. The film card holder assembly 38 is affixed to a carriage assembly 44 by means of a pair of elongated rods 46 and 48. The carriage assembly 44 is supported by a second pair of rods 50 and 52 (also shown in FIG. 8) affixed to a housing 54. The supporting rods 46 and 48 are disposed in a longitudinal direction, and the film card holder assembly 38 is slidingly mounted on the rods 46 and 48 to permit a forward and aft movement of the holder assembly 48 with respect to the carriage assembly 44. The rods 50 and 52 are horizontally mounted in a direction perpendicular to the rods 46 and 48, and the carriage assembly 44 is slidingly mounted to the rods 50 and 52 to permit a side to side movement of the carriage assembly 44 with respect to the housing 54. The side to side movement of the carriage assembly 44 permits either one of the two film holders 40 and 42 to be brought into the illumination path of the optics assembly 22, and the forward and aft movement of the housing assembly 38 permits each micro-image disposed on the film card that is aligned in the illumination path to be successively brought into the illumination path of the optics system 22 and projected onto the viewing screen 12 or into the reproduction assembly 14.

Figure 3:
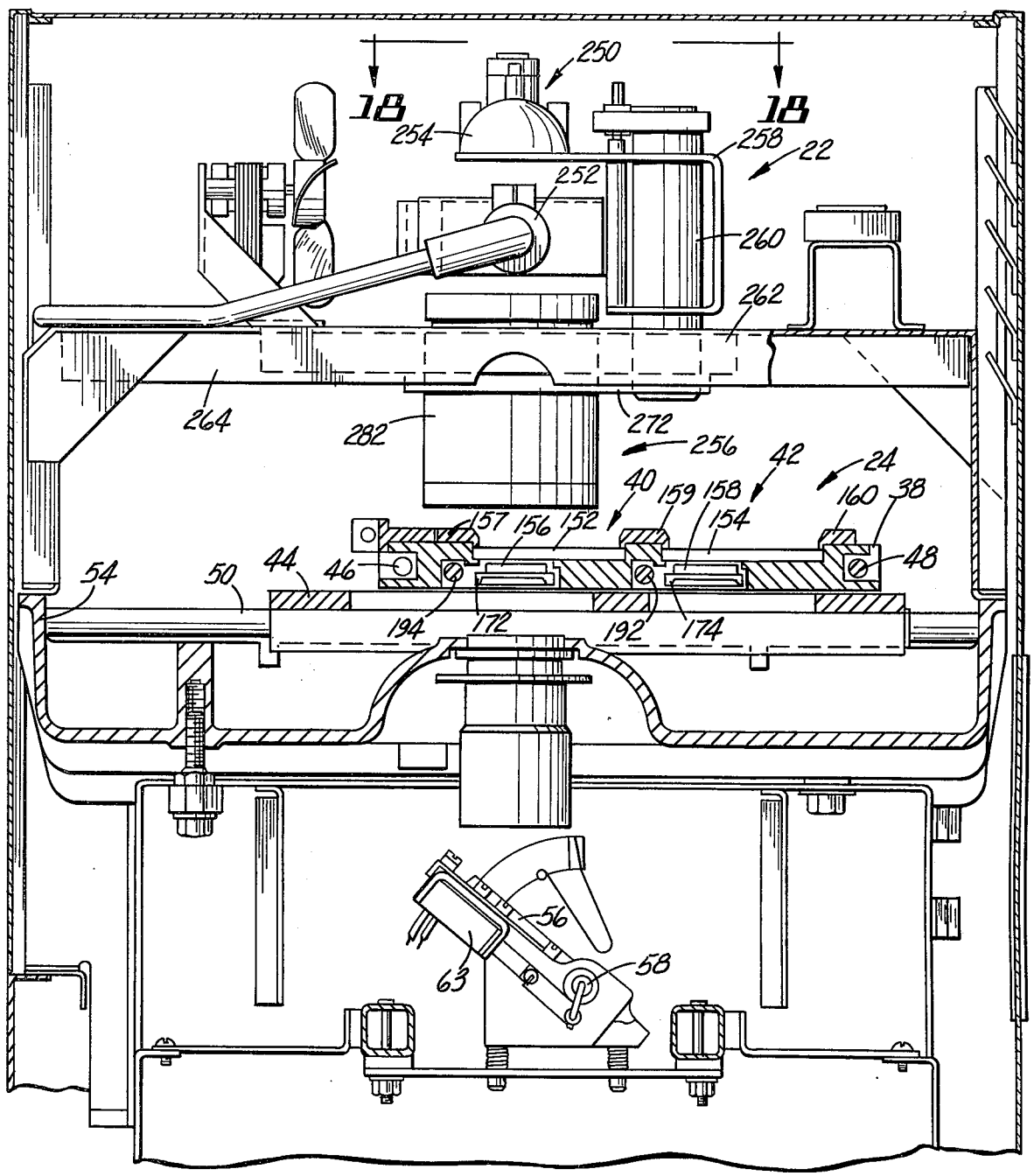
FIG. 3 is a front sectional view of the illumination source, the optics assembly and the transport assembly of the viewer printer machine illustrated in FIG. 1.
Figure 4:
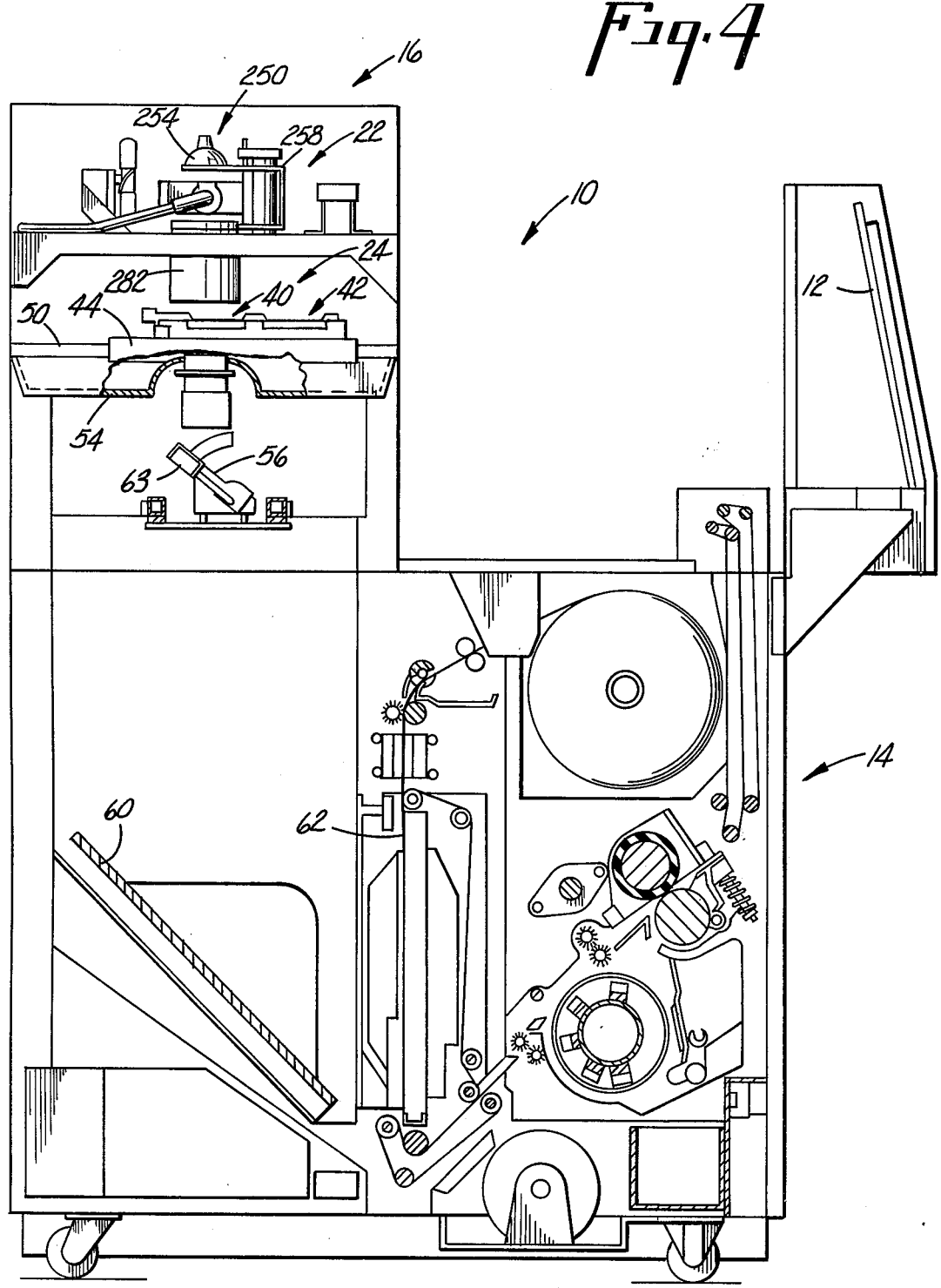
FIG. 4 is a front sectional view of the viewer printer machine illustrated in FIG. 1.

Whether the micro-image aligned in the illumination path of the optics 22 is projected onto the viewing screen 12 or onto the reproduction assembly 14 depends upon the position of a flip mirror 56. With the flip mirror 56 positioned as shown in FIGS. 3 and 4, the micro-image will be projected onto the viewing screen 12; however, when the flip-mirror 56 is pivoted clockwise approximately 45° about its axis of rotation 58 so that it is out of the path of illumination of the optical system 22, the image is projected downwardly onto a reflecting surface 60 and then onto an electrostatically charged reproducing medium 62 to provide a paper copy reproduction of the micro-image.

The position of the flip-mirror 56 is controlled by an electrically operated solenoid 63 which is controlled by the logic circuitry (described in a subsequent portion of the specification) that controls the movement of the film card holder assembly 38 and the carriage assembly 44. The logic circuitry causes the flip-mirror 56 to be normally positioned as shown in FIGS. 3 and 4 for projecting the microimage onto the viewing screen 12, and automatically to be rotated out of the path of illumination during the automatic reproduction sequence.

Figure 5:
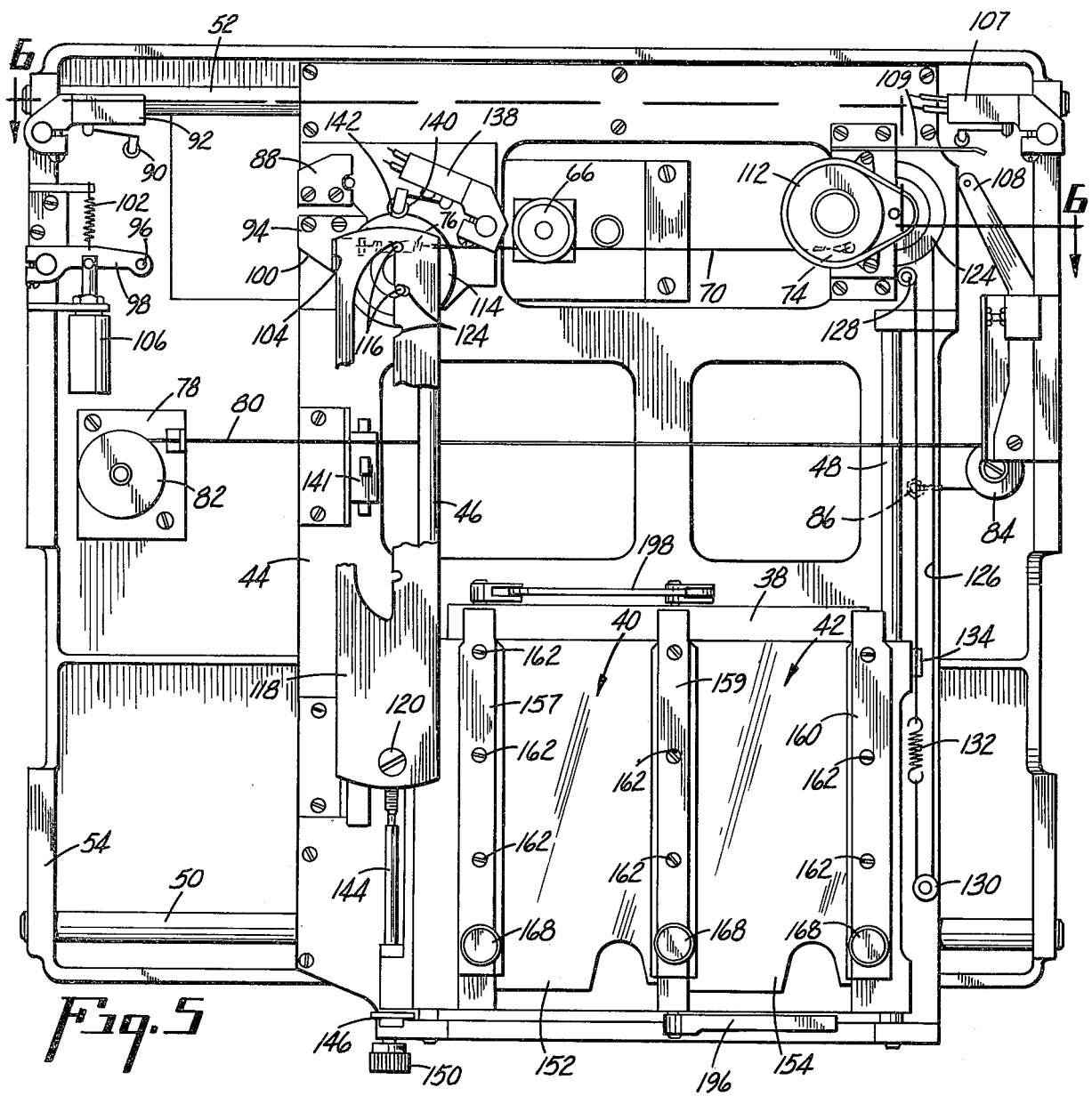
FIG. 5 is a top plan view of the transport mechanism including the carriage assembly and film holder assembly utilized by the machine of FIG. 1.
Figure 6:
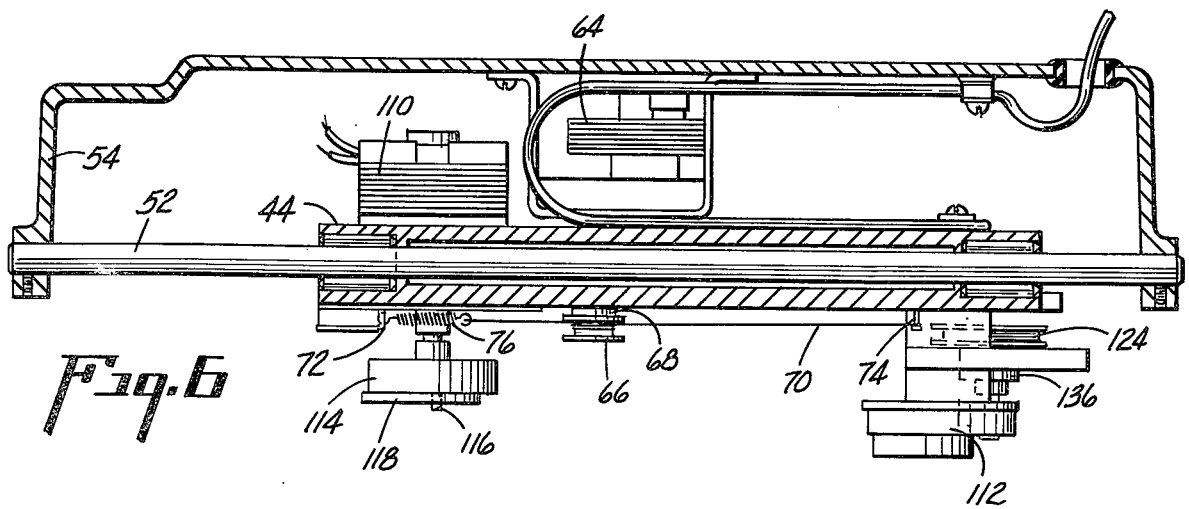
FIG. 6 is a front sectional view of the transport mechanism shown in FIG. 5 taken along line 6—6 thereof.
Figure 7:
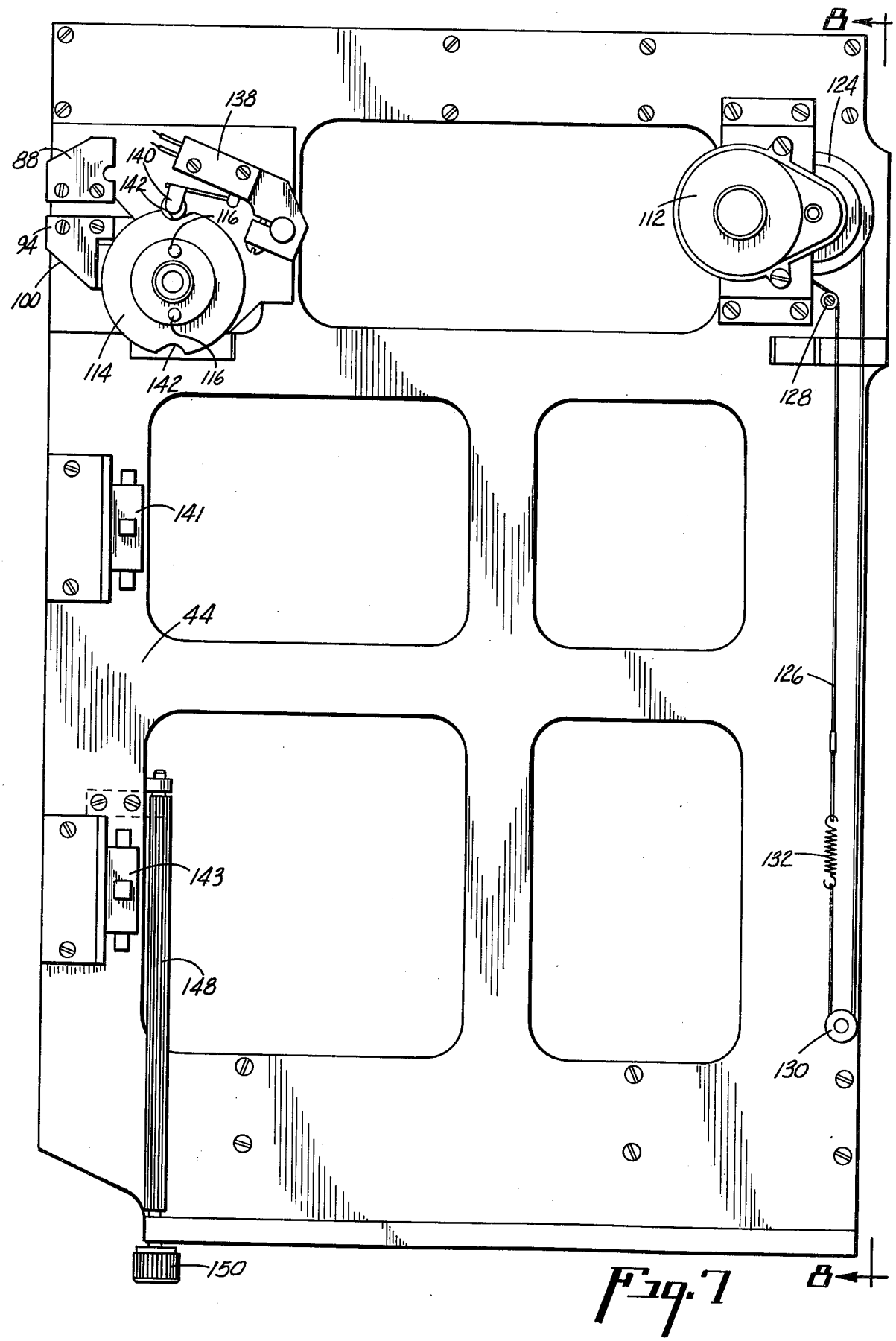
FIG. 7 is a top plan view of the carriage assembly shown in FIG. 5.

The transport mechanism 24 is best illustrated in FIGS. 5–7. The carriage assembly 44 is slidingly supported by the rods 50 and 52 for side to side movement with respect to the housing 54 for selectively bringing one of the film holders 40 and 42 into alignment with the path of illumination of the machine 10. A carriage positioning motor 64 is mounted to the housing 54 and serves to move the carriage 44 in a right to left direction. A pulley 66 is rotated by the motor 64 and an electromagnetic clutch 68 is employed to permit the pulley 66 to free wheel when the motor 64 is not energized. A cord 70, similar to the dial string used in radio receivers, is wrapped around the pulley 66 and affixed to a pair of posts 72 and 74 protruding from the carriage 44. A tensioning spring 76 is employed to tension the cord 70 and to compensate for variations in the length of the cord 70.

In order to provide left to right movement of the carriage 44 a spring motor 78 is mounted to the housing 54. A cord 80 is wrapped around a pulley 82 of the spring motor 78, passed around an idler pulley 84 affixed to the housing 54 and attached to a post 86 protruding from the carriage 44.

In operation, in order to move the carriage 44 from right to left to bring the holder 42 into alignment with the path of illumination, the motor 64 and the clutch 68 are electrically energized and cause the pulley 66 to rotate. The rotation of the pulley 66 exerts tension on the section of the cord 70 between the pulley 66 and the post 74, thereby causing the carriage 44 to move in a right to left direction. As the carriage 44 is moved in the right to left direction by the motor 64, the carriage 44 exerts tension on the cord 80. This causes the cord 80 to unreel from the pulley 82 against the spring tension of the spring motor 78. The pulley 66 continues to rotate unitl the carriage 44 reaches its most leftward position, at which point a camming member 88 engages a lever 90 of a two film limit switch 92 thereby deenergizing the motor 64 and the clutch 68. The actuation of the two film limit switch 92 also indicates to the logic circuitry of the machine 10 that the second film card is in the optical path. Simultaneously, a second latching member 94 engages a pin 96 protruding from a spring loaded lever 98. The pin 96 passes over a ramp face 100 of the latching member 94, causing the lever 98 to pivot against the biasing force of a spring 102. After the pin 98 passes over the face 100, the spring 102 returns the lever 98 to its original position to bring the pin 96 into engagement with a face 104 of the latching member 94 to maintain the carriage 44 latched in its leftwardmost position.

In order to return the carriage 44 to its rightwardmost position, a solenoid 106 is electrically energized in order to move the pin 96 out of engagement with the face 104. This releases the carriage 44 and permits the spring tension applied to the cord 80 by the spring motor 78 to move the carriage 44 toward the right. Because neither the motor 64 nor the clutch 68 is energized during this operation, the pulley 66 free wheels, and the spring motor 78 need not accelerate the mass of the armature of the motor 64.

A spring loaded lever 108 is mounted to the right side of the housing 54 to cushion the shock of the carriage 44 as the carriage 44 is returned by the spring motor 78. A one film limit switch 107 is engaged by a member 109 when the carriage 44 is in its rightwardmost position to indicate to the control logic of the machine that the first film card 26 is in the optical path.

The fore and aft motion of the film holder assembly 38 is provided by a stepping motor 110 working against the force of a preloading motor 112. The operation of the stepping motor 110 is similar to the operation of the fore and aft stepping motor discussed in the referenced Goebel patent. The stepping motor 110 is affixed to the carriage 44 and rotates a wheel 114 having a pair of driving pins 116 extending therefrom. An elongated rack 118 is affixed to the film card holder 38 by means of a screw 120 which is screwed into a shock mounted block 122 (FIG. 9). The pins 116 successively engage a plurality of slots 124 in the rack 118. The pins 116 and the slots 124 are spaced apart a distance corresponding to the distance between the micro-images on the film cards 26 and 28, and the film card holder assembly 38 is advanced incrementally toward the rear of the machine 10 by an amount equal to the spacing between the micro-images in response to each one half revolution of the wheel 114. The preloading motor 112 is attached to the carriage assembly 44 and applies a preloading force to the film card holder assembly 38 by means of a pulley 124 and a cord 126. The cord 126 is wrapped around the pulley 124 and passed over a pair of idler pulleys 128 and 130 rotatably affixed to the carriage 44. The cord 128 is tensioned by a tensioning spring 132 which provides the desired tension for the cord 126 and compensates for variations in the length of the cord 126. A collar 134 is formed along one edge of the film card holder assembly 38 for attaching the cord 126 to the assembly 38 to permit the assembly 38 to be moved in a forward direction by the cord 126. An eighth frame position limit switch 141 is engaged by the film card holder assembly 38 when the assembly 38 is in its rearwardmost position, and a carriage stop limit switch 143 is engaged when the assembly 38 is in its forwardmost position to indicate to the control logic whether the first or eighth frame is aligned in the optical path.

Power is applied to the pulley 124 from the motor 112 by means of a spring clutch 136 (FIG. 6). The spring clutch 136 is a standard spring clutch utilizing a coil spring wrapped around a driving shaft for transferring power. Under normal conditions, the spring grips the driving shaft and transfers power therethrough; however, when the torque exerted on the spring exceeds a predetermined level, for example, 8 ounces in this embodiment, the spring is slightly released and relative motion between the spring and the driving shaft is permitted to maintain the output torque at a constant level. Consequently, the pulley 124 exerts a constant force on the cord 126 to provide a constant forwardly directed force on the film card holder assembly 38 to maintain the pins 116 biased against one of the walls of the slots 124 to eliminate backlash between the pins 116 and the slots 124 and to provide a more accurate positioning of the microfilm card within the path of illumination.

In operation, each time it is necessary to advance the film card holder assembly 38 one increment, an electrical impulse is applied to the motor 110 to cause the motor to begin to rotate in a counterclockwise direction when viewed from the top. As the motor 110 begins to rotate, the wheel 114 also rotates and closes a cam switch 138 that is actuated by a lever arm 140 riding on the periphery of the wheel 114. The switch 138 remains closed for one half of a revolution of the wheel 114, and maintains the motor 110 energized for the one half revolution. After the wheel 114 has rotated one half revolution, the lever 140 engages one of two diametrically opposed depressions 142 formed in the periphery of the wheel 114 to thereby open the switch 138 and cause the motor 110 to be deenergized. The sequence is repeated by applying another pulse to the motor 110 each time the film holder assembly 38 is incremented to bring the next image into alignment with the illumination path. The stepping sequence is more fully described in conjunction with the description of the machine logic circuitry.

After the film holder assembly 38 has been incremented such that every one of the micro-images dispopsed on one of the microfilm cards 26 and 28 has been passed through the path of illumination, the wheel 114 is rotated a fraction of a turn clockwise and then counterclockwise, in a manner described in the referenced Goebel patent, to disengage both of the pins 116 from the slots 124. This permits the carriage assembly 38 to be returned to its forward position by the preloading motor 112. Because the maximum rate of speed that the film holder assembly 38 can reach is determined by the speed of the motor 112, the film holder assembly 38 is gently returned to its forward position without being unduly accelerated. This action is in contrast to the action of spring motors which tend to accelerate the object being returned and require some sort of braking apparatus to prevent undue mechanical shock when the device being returned reaches the end of its travel.

Because of the variations in the positioning of the micro-images on the film cards 26 and 28, it is desirable to provide aa vernier adjustment of the fore-aft position of the film card holder assembly 38. This is accomplished by mounting the block 122 (FIG. 9) on a threaded shaft 144. The threaded shaft 144 is rotatably supported at its ends by the film card holder assembly 38, and a gear 146 is affixed to an end of the shaft 144 protruding from the forward end of the film card holder assembly 38. The gear 146 engages an elongated splined shaft 148 (FIG. 7) rotatably affixed to the carriage 44 and mounted with its elongated axis parallel to the direction of travel of the film card holder assembly 38. A knob 150 is affixed to an end of the shaft 148 protruding from the front of the carriage 144.

In order to center the micro-image in the path of illumination, the operator projects the micro-image onto the viewing screen 12 and rotates the knob 150 until the micro-image is properly positioned on the viewing screen. The rotation of the knob 150 causes the splined shaft 148 to rotate and in turn to rotate the gear 146 and the threaded shaft 144. As the threaded shaft 144 is rotated, the block 122 is moved longitudinally to thereby cause relative movement between the rack 118 and the film card holder assembly 38.

Although the knob 150 could be attached directly to the threaded shaft 144 in place of the gear 146, the arrangement of the present invention has the advantage that the position of the knob 150 remains fixed as the film card holder assembly 38 is moved forward and aft and permits the knob 150 to be easily reached even with the film card holder assembly 38 positioned in its rearwardmost position.

The film card holder assembly 38 (FIGS. 9–11 and 14–17) comprises the two film card holders 40 and 42 previously described. The film card holders 40 and 42 each include an upper glass plate 152 and 154 and a lower glass plate 156 and 158, respectively. The lower surfaces of the upper glass plates 152 and 154 define the plane of the film cards 26 and 28, respectively, and must, therefore, be mounted with great precision within the film card holder assembly 38. In addition, it is desirable to make the glass plates 152, 154, 156 and 158 readily removable for cleaning. Therefore, in accordance with an important feature of the present invention, the upper glass plates 152 and 154 are secured in place with three elongated strips 157, 159 and 160. The three elongated strips 157, 159 and 160 are attached to the film card holder assembly 38 by nine retaining screws 162. A coil spring 164 (FIG. 12) is passed over each of the screws 162 and serves to exert a downward pressure against one of the elongated strips 157, 159 and 160 to maintain each one of the strips in intimate contact with an edge of one of the upper glass plates 152 and 154. This causes the glass plates 152 and 154 to be firmly pressed against a plurality of precision machined glass supporting surfaces 166 (FIGS. 14 and 15). As a result, the bottom surface of the upper glass plates 152 and 154 is positioned with great precision and is not affected by factors such as variations in the thickness of the upper glass plates 152 and 154.

The pressure exerted by the springs 164 is selected so that the glass plates 152 and 154 are maintained in intimate contact with the supporting surfaces 166 and so that the glass plates 152 and 154 are not readily withdrawable from the film card holder assembly 38. In order to permit the glass plates 152, 154, 156 and 158 to be easily removed for cleaning, a thumb screw 168 is threaded into each of the elongated strips 157, 159 and 160. A retaining washer 170 is affixed to the end of the thumb screw 168 (FIG. 13) to prevent the thumb screw 168 from being completely removed from the elongated strip. The function of the thumb screws 168 is to lift the elongated strips 157, 159 and 160 against the force of the coil springs 164 to permit the glass plates 152 and 154 to be withdrawn from the film card holder assembly 38.

Under normal operating conditions, the thumb screws are unscrewed so that the end of the thumb screw 168 does not contact the frame of the film card holder assembly 38. This permits the springs 164 to exert a downward pressure onto the strips 157, 159 and 160 to maintain the strips in contact with the glass plates 152 and 154. Screwing the thumb screws 168 into the respective elongated strips 157, 159 and 160 causes the ends of the thumb screws 168 to contact the frame of the film card holder assembly 38, thereby causing the elongated strips 157, 159 and 160 to be raised against the pressure of the coil springs 164. This releases the pressure exerted by the strips 157, 159 and 160 against the glass plates 152 and 154 and permits an operator to slide the upper plates 152 and 154 forward to remove them from the film card holder assembly 38. Removal of the upper glass plates 152 and 154 provides access to the lower glass plates 156 and 158 and thereby allows removal of the lower glass plates 156 and 158.

The lower glass plates 156 and 158 are movably mounted within the film card holder assembly 38. The glass plates 156 and 158 are movable to a first open position to permit the insertion and removal of the film cards 26 and 28, and to a second closed position wherein they resiliently bias the film cards 26 and 28 into engagement with the lower surfaces of the upper glass plates 152 and 154. The lower glass plates 156 and 158 are supported by a pair of supporting frames 172 and 174 (FIGS. 11, 14, 15 and 16). The frames 172 and 174 are pivotally retained within the film card holder assembly 38 by four axially extending pins 176, 178, 180 and 182. The pins 176, 178, 180 and 182 engage four pivotable supporting members 184, 186, 188 and 190. Each of the pivotable supporting members 184, 186, 188 and 190 pivotably engages the frame of the film card holder assembly 38 at one end thereof and engages one of a pair of rods 192 and 194 at the opposite end. The rods 192 and 194 are rotatably mounted within the housing of the film card holder assembly 38 and are rotated by a lever 196. An interconnecting linkage 198 is provided between the two rotatable rods 192 and 194 to cause both rods to rotate simultaneously upon rotation of the lever 196.

Each of the rods 192 and 194 has a flat portion formed therein at the point of engagement with the supporting members 184, 186, 188 and 190 to permit the supporting members to be biased upwardly by a plurality of resilient sheath springs 200, 202, 206, 208, 210 and 212. Rotating the shaft 192 and 194 to bring the curved portion of the shaft into engagement with the supporting members 184, 186, 188 and 190 exerts a downwards pressure on the supporting members and separates the upper and lower glass plates 152, 154 and 156, 158 to permit the insertion or withdrawal of the film cards 26 and 28. A pair of finger openings 214 and 216 permit the film cards 26 and 28 to be readily grasped by the operation.

The springs 200, 202, 206, 208, 210 and 212 exert an upward biasing pressure to bias the glass plates 156 and 158 into engagement with the respective upper glass plates 152 and 154. Because the lower glass plates 156 and 158 are pivotally mounted in the respective frames 172 and 174, any inequality in pressure supplied by the springs 200, 202, 206, 208, 210 and 212 can cause the frames 172 and 174 to rotate about the mounting pins 176, 178, 180 and 182 sufficiently to maintain one edge of one of the lower glass plates 156 and 158 in contact with the lower surface of one of the upper glass plates 152 and 154 even when the lever 196 is moved to the released position. This contact can prevent a film card from being inserted between the glass plates and can make the withdrawal of film cards difficult. Accordingly, in order to limit the amount that the frames 172 and 174 can be rotated, a pair of stop members 214 and 216 (FIG. 11) are attached to the base of the film card holder assembly 38 to limit the amount of rotation of the frames 172 and 174 (shown in greater detail in FIGS. 16 and 17). The leveling member 216 is attached to the base of the film card holder assembly 38 by means of three machine screws 218. The leveling member 216 has a lip portion 220 (FIG. 17) that engages a portion 222 of the frame 174. The spacing between the lip portion 216 and the frame portion 222 is selected to limit the range of rotation of the frame 174 sufficiently to prevent the lower glass plate 158 from contacting the upper glass plate 154 when the film card holder is in its released position. In a similar fashion, the leveling member 214 prevents the lower glass plate 156 from contacting the upper glass plate 152.

2. Optics Assembly

The illumination source 22 contains a viewing lamp 250 and a xenon flash lamp 252 (FIGS. 18–21). The viewing lamp 250 is a relatively low power incandescent lamp and serves to illuminate the micro-images for projection onto the viewing screen 12. The xenon flash lamp 252 is a relatively bright lamp that is periodically flashed to project an image onto the paper 62 to provide a hard copy of one of the micro-images. In order to provide optimum exposure of the micro-image onto the paper 62, the flash lamp 252 must be positioned so that the arc of the flash lamp 252 lies at the focal point of the optics of the machine 10. Furthermore, the viewing lamp 250 includes a focusing reflector 254 which is designed and positioned to focus the viewing lamp 250 onto the focal point of the machine optics. This results in the viewing lamp 250 being focused onto the arc gap of the flash lamp 252. Accordingly, both the viewing lamp 250 and the flash lamp 252 must be movable with respect to the machine optics 256. In order to provide the movement necessary for focusing the lamps 250 and 252, the assembly supporting the viewing lamp 250 and the flash lamp 252 is adapted to move both the viewing lamp 250 and the flash lamp 252 as a unit with respect to the optics 256, and to further permit separate movement of the flash lamp 252 with respect to the viewing lamp 250 and the optics 256.

Figure 18:
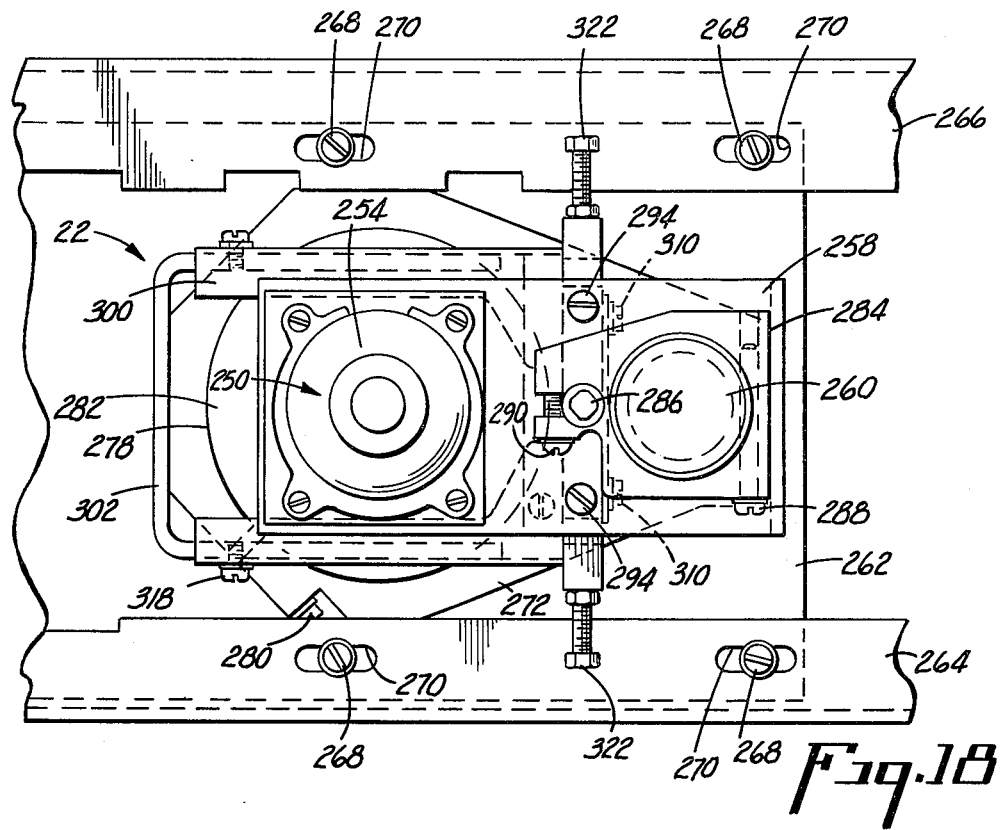
FIG. 18 is a detailed top view of the light illumination source taken along line 18—18 of FIG. 3.
Figure 19:
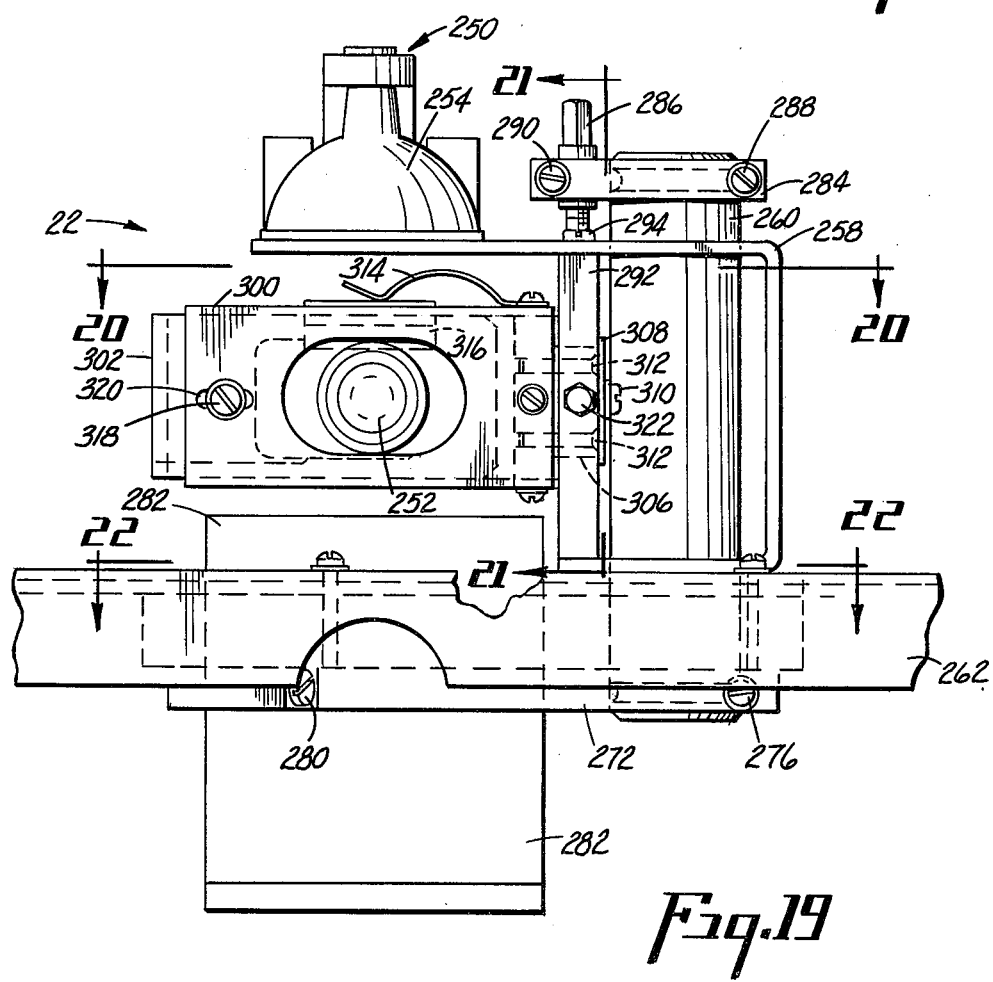
FIG. 19 is a detailed side view of the illumination source shown in FIG. 18.

The viewing lamp 250 is supported by a bracket 258 which is in turn supported by a supporting post 260. The post 260 is affixed to a supporting plate 262 which is supported by a pair of parallel L-shaped supporting members 264 and 266 mounted horizontally within the projection assembly 16. The supporting plate 262 is supported by four supporting screws 268 which pass through four elongated openings 270 formed in the L-shaped supporting members 264 and 266. The elongated openings 270 permit the plate 262 to be laterally displaced with respect to the optics assembly 266 to permit a simultaneous horizontal adjustment of the viewing lamp 250 and the flash lamp 252 with respect to the optics assembly 256. The supporting post 260 is secured to the plate 262 by means of a collar assembly 272 (FIGS. 18, 19 and 22). The collar assembly 272 includes an aperture 274 for receiving the post 260 and a securing screw 276 for securing the post 260 in place. A similar aperture 278 and securing screw 280 is provided to retain a condensor lens 282 of the optics assembly 256 in the illumination path. A second collar 284 (FIGS. 18 and 19) is attached to the top end of the post 260 for supporting a vertical adjusting screw 286. A screw 288 is employed to tighten the collar 284 about the post 260 and another screw 290 is used to prevent the rotation of the vertical adjusting screw 286 after the vertical position of the bracket has been established. A vertical supporting plate 292 is attached to the bracket 258 with a plurality of machine screws 294, and the vertical adjusting screw 286 passes through a hole 296 (FIG. 21) in the bracket 258 and into a mating threaded hole 298 in the vertical plate 292. As a result, rotation of the vertical adjusting screw 286 causes the vertical adjusting screw 286 to be threaded into the threaded hole 298 in the vertical plate 292 to provide a vertical adjustment of the bracket 258 and the lamps 250 and 252. A fore and aft adjustment of the viewing lamp 250 is provided by loosening the screw 288 and rotating the entire assembly about the post 260.

After the position of the lamp 250 has been adjusted in the horizontal direction by sliding the screws 268 in the slots 270, in the vertical direction by means of the vertical adjusting screws 286, and in the fore and aft direction by rotating the collar 284 about the post 260, the flash lamp 252 must be adjusted in the horizontal and fore and aft directions with respect to the viewing lamp 250 and the optics assembly 256 to position the arc of the flash lamp 252 at the focal point of the optics assembly 256. The flash lamp 252 is supported by a bracket 300 attached to the plate 292 and a second bracket 302 slidingly supported by the bracket 300 (FIGS. 20 and 21). The bracket 300 has a protrusion 304 that is slidingly supported within an aperture 306 of the plate 292. A backing plate 308 (FIG. 19) and a pair of supporting screws 310 support the protrusion 304 within the aperture 306. The protrusion 304 is fixedly attached to the bracket 300 by four mounting screws 312. The bracket 302 supports the xenon lamp 252 in contact with electrical contact members 314 and 316, and is slidingly supported within the bracket 300 by a pair of screws 318.

The screws 318 pass through a pair of elongated slots 320 formed in the sides of the bracket 300. The elongated slots 320 permit a lateral movement of the xenon lamp 252 with respect to the viewing lamp 250 and the optical assembly 256. Fore and aft motion of the xenon lamp 252 is provided by a pair of fore and aft adjusting screws 322. The fore and aft adjusting screws are threaded into the plate 292 and bear on the protrusion 304 to move the bracket 300 in a fore and aft direction with respect to the optics assembly 256 and the viewing lamp 250. A pair of nuts 324 are utilized to prevent rotation of the adjusting screws 322 after the fore and aft adjustment of the xenon lamp 252 has been made.

C. Electrical Aspects

Figure 23:
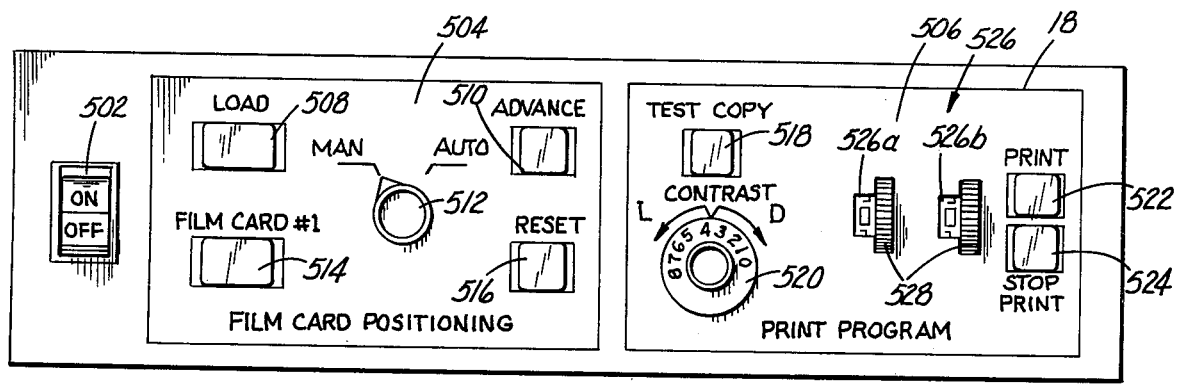
FIG. 23 is a detailed view of the control panel of the machine illustrated in FIG. 1.

The various functions provided by the machine are selectable by means of the control panel 18 (FIG. 23). The control panel 23 has an on/off switch 502, which when energized serves to apply power to the machine. Controls for selecting the position of the film card are provided in an area 504, and controls for determining the number of copies and for adjusting the copy quality are provided in an area 506. The film card positioning area 504 has a load switch 508, an advance switch 510, a manual/automatic mode selector switch 512, a film card No. 1 switch 514 and a reset switch 516. All of these controls serve to adjust the position of the film cards within the machine 10 and to control the sequence in which the images disposed on the film cards are transported through the machine optics.

Explaining the functioning of each of these switches individually the load switch 508 serves to bring the carriage 44 to the left (No. 2 film card position) and the film card holder 38 to the rear (No. 8 frame position) to thereby bring the last frame (No. 8 frame) of the second card 28 (No. 2 card) into the optical path of the machine 10. For purposes of discussion, in this section the film card 26 will be referred to as the No. 1 (or left) film card, the film card 28 will be referred to as the No. 2 (or right) film card.

The advance switch 510 serves to advance the images sequentially through the machine optics. An intermittent depression of the advance switch 510 will step the images by one frame, and a continuous depression causes the frames to be sequentially stepped until the switch 510 is released. The manual/automatic selector switch 512 determines whether two film cards or only a single film card will be automatically stepped through the machine optics. With the mode selector switch in the manual position, only one of the film cards will be stepped through, while in the automatic position, the No. 2 film card 28 will be stepped through the optics first, followed by the No. 1 film card 26. The film card No. 1 switch 514 positions the film card 26 (film card No. 1) into the optical path without resetting the holder, and activating the reset switch 516 brings the holder into the No. 8 frame position without resetting the carriage.

The print programming section 506 has a test copy switch 518, a contrast control 520, a print switch 522, a print stop switch 524 and a copy counter 526 having a tens counter 526a and a units counter 526b. The test copy switch 518 causes a single copy of the micro-image positioned in the optical path to be made without advancing the carriage. The contrast control 520 adjusts the contrast of the print to compensate for variations in the density of the micro-images and for other factors.

The print switch 522 starts the printing sequence, and the print stop switch 524 interrupts the sequence. Subsequent to interruption, the sequence may be resumed at the point where interrupted by activating the print switch 522. If it is desired to cause the machine to resume stepping at a new position in the sequence, the advance switch 510 is first actuated to bring the holder or carriage to the new position. This reprograms the memory and causes the sequence to resume at a new point when the print switch is subsequently depressed.

The copy counter 526 determines the number of copies to be made of each of the micro-images. The desired number of copies is entered into the copy counter 526 by rotating a pair of thumb wheels 528 until the desired number has been set into the counter 526. Depressing the print button then initiates the printing sequence, and each time a sequence is completed, the counter 526 is decremented one unit. This process continues until the counter 526 is reset to zero, whereupon the printing sequence is automatically terminated.

In order to better explain the machine functions, a typical machine operating sequence is described below. For purposes of illustration, we shall assume that a document occupying more than one film card is to be copied. Accordingly, the mode selector switch 512 is set to the automatic position and the two film cards are loaded into the film card holder assembly 38. After the film card holders 40 and 42 have been loaded, the load switch 508 is activated to bring the holder and carriage into the No. 8 frame position of the No. 2 film card 28. The advance switch 510 is then actuated and the viewing screen 12 is observed until the last image on the No. 2 film card 28 appears on the viewing screen 12. At this point the advance switch 510 is released, and a test copy is run by actuating the test copy switch 518. If necessary, the contrast control 520 should be adjusted to provide the desired copy quality. After the contrast control 520 has been set to provide the desired copy quality, the number of copies of the document desired is entered into the copy counter 526, and the print switch 522 is actuated to initiate the automatic copying sequence. After the sequence has been run, the printing operation is automatically terminated. At this point, the copies may be inspected by the operator, and should one of the copies be faulty, the carriage may be stepped to the frame corresponding to the faulty copy by depressing the advance switch 510, and a test copy run by depressing the test copy switch 518 to provide a replacement copy for the faulty copy. Operation in the manual mode is similar except that only one of the film cards 26 and 28 is stepped through the machine optics during the printing sequence. In the one position manual mode only the No. 1 film card 26 is stepped through, and in the two position manual mode only the No. 2 film card is stepped through.

Figure 24:
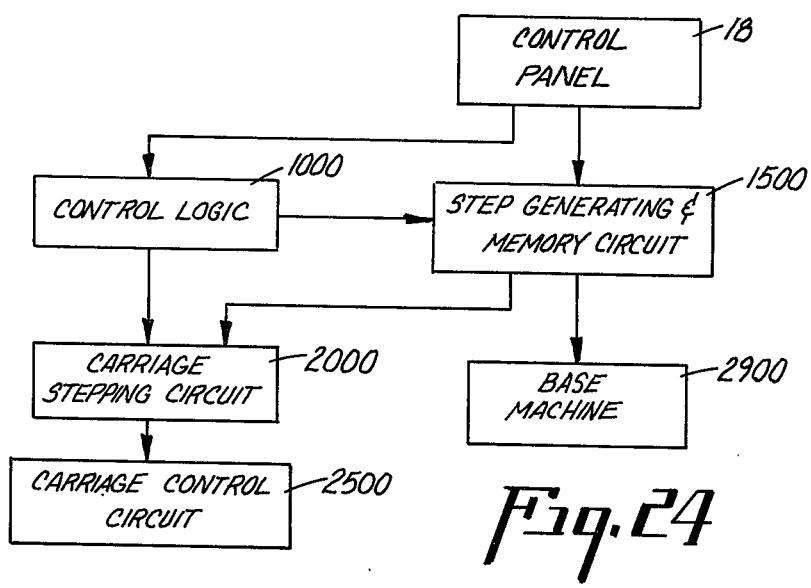
FIG. 24 is a general block diagram of the logic circuitry of the viewer printer machine according to the invention.

The layout of the machine controls is shown in FIG. 24. The control panel 18 is coupled to a control logic circuit 1000 which controls the mode of operation of the machine and generates the necessary carriage positioning signals that initiate and terminate the various stepping sequences. The control panel 18 and the control logic circuit 1000 are also coupled to a step generating and memory circuit 1500 which stores the information indicating the number of frames to be stepped in each sequence and generates the stepping pulses for stepping the carriage through the sequence. A carriage stepping circuit 2000 receives signals from the control logic 1000 and the step generating and memory circuit 1500 to generate the necessary motor control signals required to step the holder assembly 38 and carriage 44. The motor control signals are received by a carriage control circuit 2500 which energizes the necessary motors to position the holder assembly 38 and carriage 44 in accordance with the information received from the carriage stepping circuit 2000. Carriage position indicative signals are generated by limit switches 92, 107, 141 and 143 electrically forming a part of the carriage control circuit 25. The signals from the limit switches 92, 107, 141 and 143 are applied to the carriage stepping circuit 2000 to indicate to the carriage stepping circuit 2000 the position of the carriage.

The generation of copies is controlled by the base machine circuitry 2900 which is responsive to the step generating and memory circuit 1500 for generating a copy upon command from the step generating and memory circuit 1500. The logic circuitry of any suitable copying machine may be used for the base machine circuitry 2900; however, the base machine circuitry of the Bruning 5000 copier described in U.S. Pat. Nos. 3,655,282; 3,655,283 and 3,663,102, incorporated herein by reference, is particularly suitable for use in conjunction with the circuitry of the present invention.

Figure 26A:
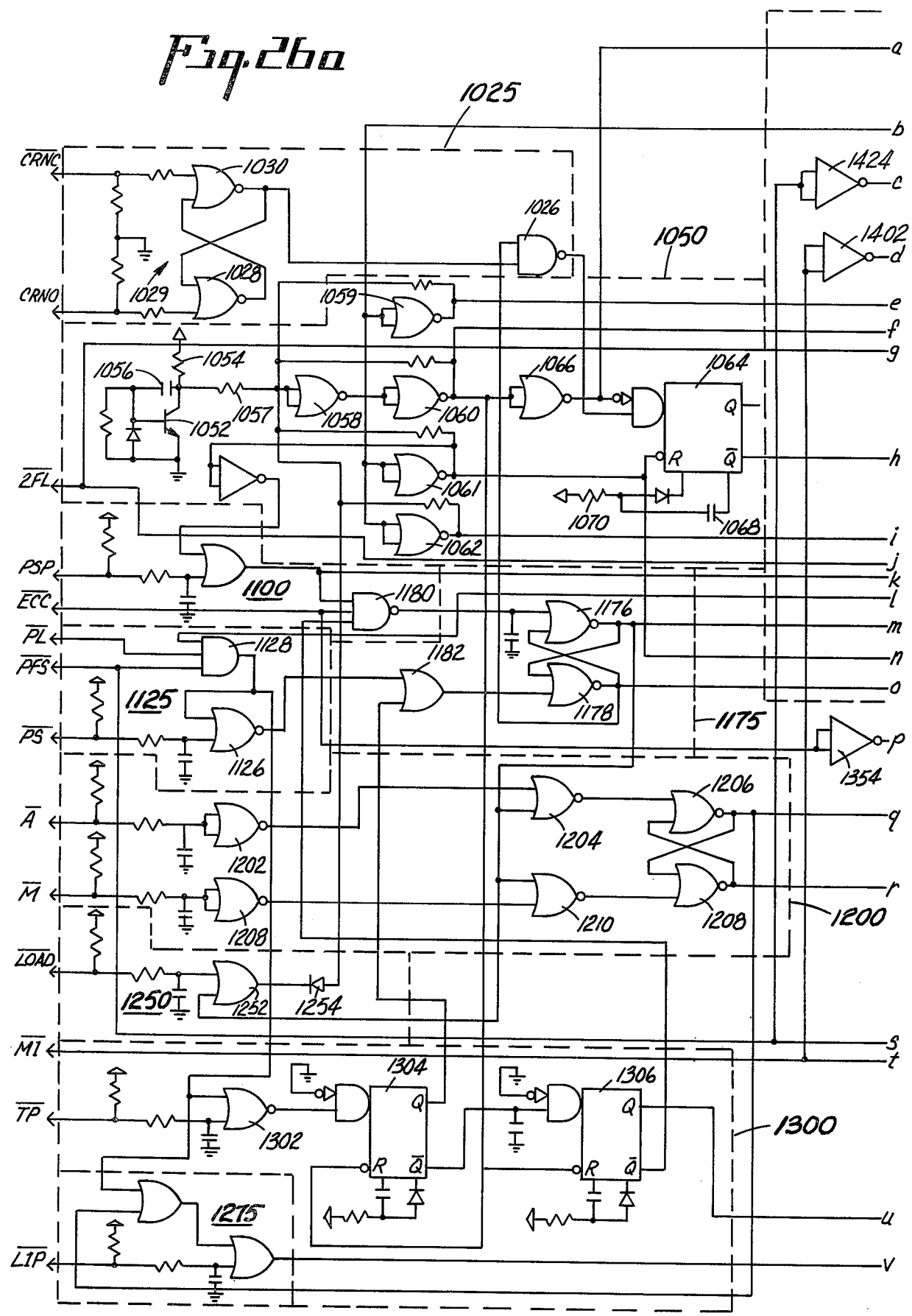
FIGS. 26a and 26b are detailed circuit diagrams of the control logic block of FIG. 1.
Figure 26B:
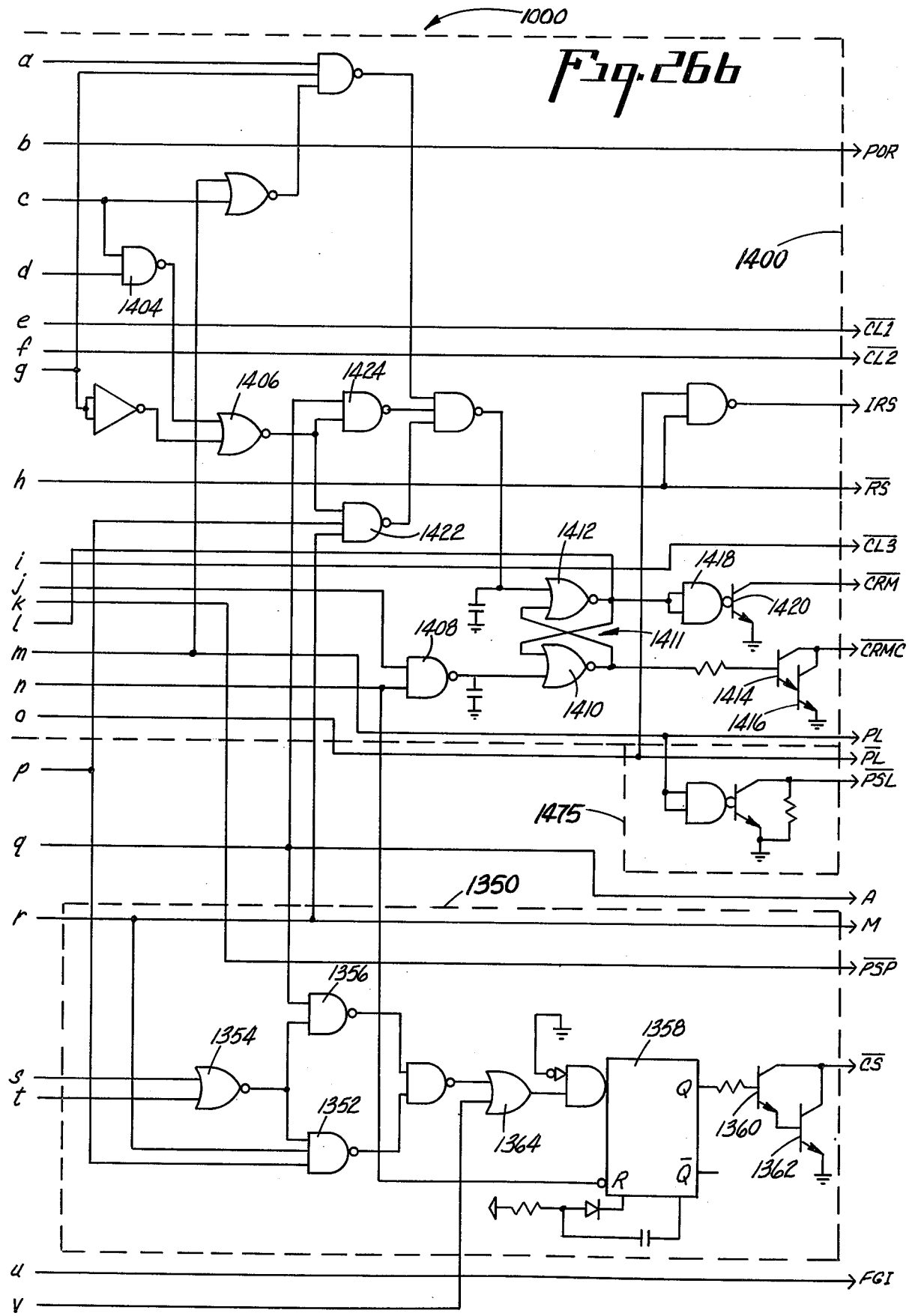
Figure 27A:
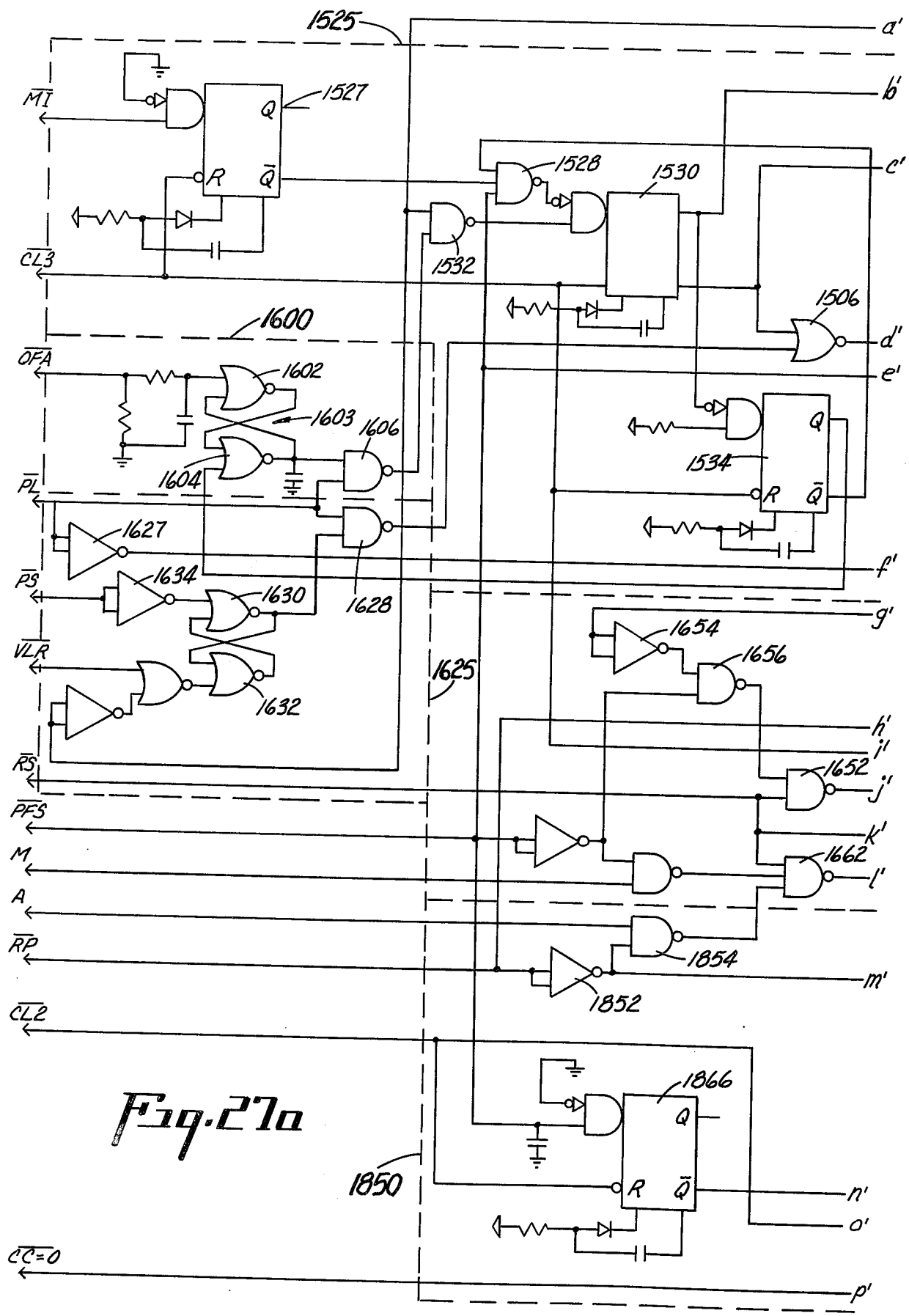
FIGS. 27a and 27b are detailed circuit diagrams of the step generating and memory circuit blocks of FIG. 1.
Figure 27B:
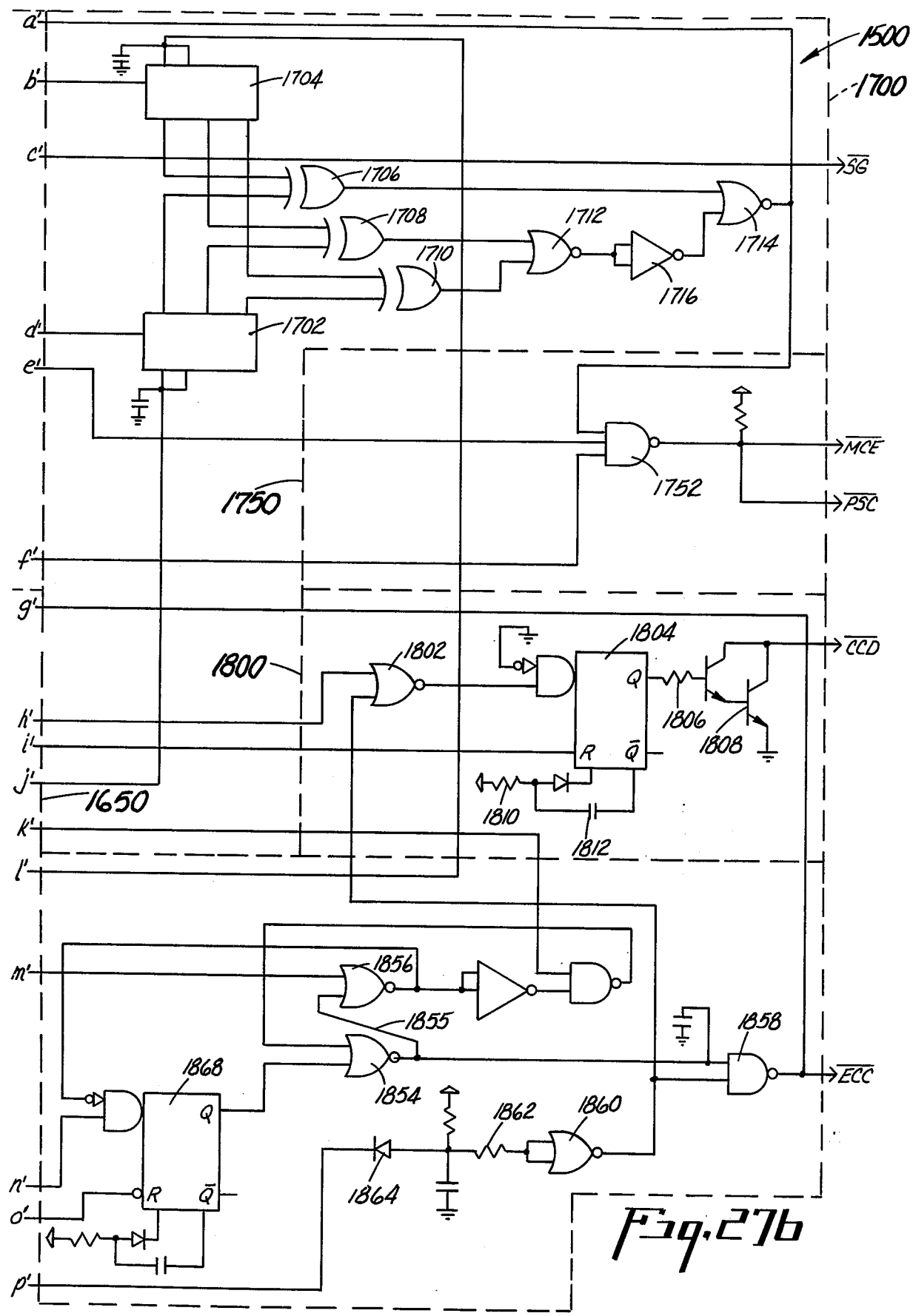
Figure 28B:
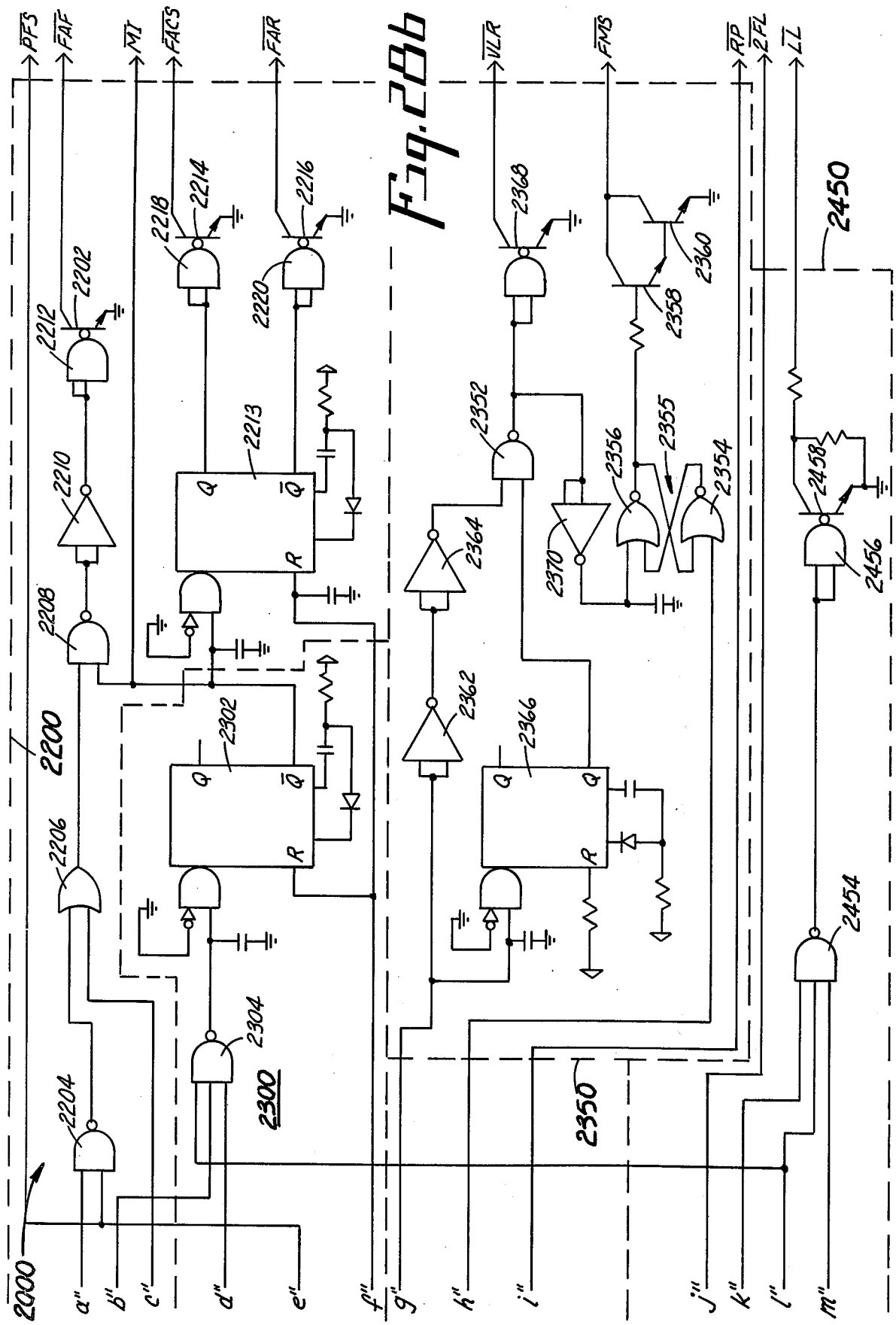

The control logic circuit 1000 is illustrated in greater detail in FIGS. 26a and 26b, the step generating and memory circuit 1500 is illustrated in FIGS. 27a and 27b, the carriage stepping circuit 2000 is illustrated in FIGS. 28a and 28b and the carriage control circuit 2500 is illustrated in FIG. 29. To further simplify the explanation of the operation of the various control circuit, each of the circuits 1000, 1500, 2000 and 2500 may be conveniently subdivided into functional blocks. For example, the control logic circuit 1000 may be divided into the following functional blocks:

| FUNCTIONAL BLOCK NAME | REFERENCE NUMERAL |
|---|---|
| Carriage return switch circuit | 1025 |

-continued

| FUNCTIONAL BLOCK NAME | REFERENCE NUMERAL |
|---|---|
| Power on reset circuit | 1050 |
| Print stop circuit | 1100 |
| Print start circuit | 1125 |
| Print latch circuit | 1175 |
| Mode of operation circuit | 1200 |
| Load circuit | 1250 |
| Carriage release circuit | 1275 |
| Test print circuit | 1300 |
| Carriage release solenoid circuit | 1350 |
| Carriage rewind motor circuit | 1400 |
| Print stop indicator light circuit | 1475 |

Similarly, the step generating and memory circuit 1500 may be subdivided into the following functional blocks:

| FUNCTIONAL BLOCK NAME | REFERENCE NUMERAL |
|---|---|
| Step generator circuit | 1525 |
| Frame advance circuit | 1600 |
| Viewing lamp inhibit circuit | 1625 |
| Memory erase circuit | 1650 |
| Positioner circuit | 1700 |
| Print command circuit | 1750 |
| Copy counter driver circuit | 1800 |
| End of copy count test circuit | 1850 |

The functional block for the carriage stepping circuit 2000 includes:

| FUNCTIONAL BLOCK NAME | REFERENCE NUMERAL |
|---|---|
| Carriage stepping circuit | 2025 |
| Paper feed stop circuit | 2075 |
| Return pulse circuit | 2100 |
| Carriage location register circuit | 2150 |
| Carriage step and reset circuit | 2200 |
| Motor impulse circuit | 2300 |
| Viewing lamp and flip mirror circuit | 2350 |
| Load indicator light circuit | 2450 |

In accordance with a preferred practice of electronic circuit designing, the details of the control circuits 1000, 1500 and 2000 are set forth in logic diagrams, rather than in detailed circuit diagrams. In physically constructing actual operative embodiments of the control circuits 1000, 1500 and 2000, each logic element illustrated may be replaced by equivalent electrical circuits that perform the logical tasks defined by that logic element. The use of logic elements emphasizes that any of the many different electrical circuits capable of performing a given task may be used interchangeably in the present invention. The preferred embodiment of the control circuits utilized several different types of logic gates: an AND gate, a NAND gate, an OR gate, a NOR gate, a NOT gate and an exclusive-OR gate. The above gates operated at one of two potential levels: either a low (or ground) potential or a relatively high (approximately +5 volts in this embodiment) potential. When the output of one of the above gates is at a low potential, that gate is referred to as being inhibited. When the output of one of the above gates is at a high potential, that gate is referred to as being enabled. Similarly, when one of the inputs to one of the above gates is at a low potential, that input is referred to as being inhibited. When that output is at a high potential, it is referred to as being enabled.

An AND gate is enabled when all of its input leads are enabled. When any one or more of the input leads to the AND gate are inhibited, the AND gate is inhibited.

A NAND gate is inhibited only when all of its input leads are enabled. When any one or more of the input leads to the NAND gate are inhibited, the NAND gate is enabled.

An OR gate is enabled when any one or more of its input leads are enabled. When all of its leads are inhibited, the OR gate is inhibited.

A NOR gate is enabled only when all of its input leads are inhibited. When any one or more of its input leads are enabled, the NOR gate is inhibited.

A NOT gate serves as an inverter and is enabled when its single input lead is inhibited. A NOT gate is inhibited when its single input lead is enabled.

An exclusive-OR gate is inhibited when both of its two input leads are enabled or when both of its two input leads are inhibited. When one of its input leads is inhibited and the other of its input leads is enabled, the exclusive-OR gate is enabled.

The circuits 1000, 1500 and 2000 also utilize various multivibrators and memory devices such as a standard type 74123 multivibrator and a standard type 7493 counter. In the circuitry of the present invention, all of the multivibrators 74123 have a resistor capacitor network connected between their $R_{ext}/C_{ext}$ and $C_{ext}$ terminals (not designated alphanumerically in the drawings) and operate as standard monostable multivibrators. The operation of these devices will be further explained as necessary as they are encountered in the description of the particular circuit in which they are used.

Many different electrical control signals are generated by the circuits 1000, 1500 and 2000 for controlling the operation of the machine 10. These control signals are set forth in the figures by the control signal designations set forth in Table I below:

TABLE I

| Designation | Name | Generated | Received |
|---|---|---|---|
| A | Automatic operation | 18 | 1200, 1850 (via 1200) |
| ACCRM | AC power to carriage rewind motor | 2500 | 2500 |
| ACFMC | AC power to carriage step motor in forward direction | 2500 | 2500 |
| ACI | AC power line, side 1 | | Power line |

TABLE I-continued

| Designation | Name | Generated | Received |
|---|---|---|---|
| ACII | AC power line, side 2 | | Power line |
| ACRMC | AC power to carriage step motor in reverse direction | 2500 | 2500 |
| CC=O | Copy counter equals zero | 18 | 1850 |
| CCD | Copy counter drive | 1800 | 18 |
| CG | Cutter gate | 2900 | 2100 |
| CKOL | Call key operator light | 2900 | 18 |
| CL1 | Clear carriage step circuit | 1400 | 2000 |
| CL2 | Clear copy count circuit | 1400 | 1500 |
| CL3 | Clear memory | 1400 | 1500 |
| CR | Carriage return | 18 | 1025 |
| CRNO | Carriage return normally open switch contact | 18 | 1025 |
| CRNC | Carriage return normally closed switch contact | 18 | 1025 |
| CRM | Carriage rewind motor | 1400 | 2500 |
| CRMC | Carriage rewind motor clutch | 1400 | 2500 |
| CS | Carriage solenoid | 1350 | 2500 |
| CSPL | Carriage stop limit | 2500 | 2000 |
| ECC | End of copy count | 1850 | 1100 |
| FACS | Frame advance cam switch | 2200 | 2500 (via 138) |
| FACS (IN) | FACS connector through cam switch | 2200 | 138 |
| FACS (OUT) | FACS connector through cam switch | 138 | 2500 |
| FAF | Frame advance forward | 2200 | 2500 |
| FAR | Frame advance reverse | 2200 | 2500 |
| FG Flash gate | | 2900 | 2025 |
| FGI | Flash gate inhibit | 1300 | 2025 |
| FMS | Flip mirror solenoid | 2350 | 2500 |
| L1P | Locate No. 1 position | 18 | 1275 |
| LL | Load light | 2450 | 18 |
| LOAD | Load | 18 | 1250 |
| M | Manual | 18 | 1200 |
| MCE | Multiple copy enable | 1750 | 2900 |
| MI | Motor impulse | 2200 | 1000, 1525 |
| OFA | Operator frame advance | 18 | 1600 |
| PFS | Paper feed stop | 2200 | 1125, 1625 |
| PL | Print latch | 1175 | 1200, 1250, 1625, 2350 |
| PLT | Print light | 2900 | 18 |
| POR | Power on reset | 1050 | 2150 |
| PS | Print start | 18 | 1125 |
| PSC | Print start command | 1750 | 2900 |
| PSL | Print stop light | 1475 | 18 |
| PSP | Print stop | 18 | 1100, 1625 |
| PSP1 | Lead No. 1 of print stop switch | | |
| PSP2 | Lead No. 2 of print stop switch (same as PSP) | | |
| RP | Return pulse | 2100 | 1500 |
| RS | Reset | 1050 | 1500, 2000 |
| SG | Step generator | 1700 | 2025 |
| TP | Test print | 18 | 1300 |
| VLR | View lamp relay | 2350 | 1625, 2900 |

TABLE I-continued

| Designation | Name | Generated | Received |
|---|---|---|---|
| 1 FL | No. 1 film limit | 2500 | 2100 |
| 2 FL | No. 2 film limit | 2500 | 2150 |
| 8 FP | 8th frame position | 2500 | 2150 |
| 5 V B+ | 5V. D.C. power supply | | |
| 24 V B+ | 24V. D.C. power supply | | |
| GROUND | ground | | |

Many of the above control signals are utilized by the circuits 1000, 1500 and 2000 in a low active state as indicated by a superscribed bar or line above each such signal designation, for example, $\overline{PL}$. In such a case, the particular function being referred to is present or true when the signal representing that function is at a low or ground potential. The absence of that particular function is indicated by a high potential. Such a signal may also be designated by the alphanumeric designation preceded by NOT, for example, NOT PL. In that case a high output potential would indicate the circuit was not print latched.

In general, the control circuit for sequentially stepping the holder includes memory circuitry for determining the number of frames to be printed and a counter (counter 526) for determining the number of prints of each frame to be made. In addition, circuitry responsive to the memory and counter circuitry is provided for stepping the carriage to provide the desired number of prints of each frame. Four limit switches 92, 107, 141 and 143 (previously described), each activated when the holder assembly or carriage reaches one of its extreme positions, indicate to the logic circuitry the position of the holder. The automatic/manual selector switch 512 (previously described) controls logic circuitry responsive to the limit switches 92, 107, 141 and 143 for sequentially stepping the carriage through the frames of both of the film cards when the automatic mode is selected and through the frames of a single film card when the manual mode is selected.

In order to better understand the operation of the machine, the function of the more complex functional blocks will be briefly described.

The positioner circuit 1700 includes an initial position counter memory 1702 and a return position counter memory 1704 both of which are programmed to count the number of steps the film holder is advanced by the advance switch 510. After the first set of copies are run, the return position counter 1704 is erased. The holder is then brought to the No. 8 frame position, and automatically stepped. The number of steps taken are counted by the return position counter memory 1704. When the count in the return position counter memory 1704 becomes equal to the count in the initial position counter memory 1702, a position ready PR signal is generated and the printing sequence is repeated. After all of the copies have been made, both the return position counter memory 1704 and the initial position counter memory 1702 are erased.

The return position counter memory 1704 is erased by the following signals:
RS, or
PFS and M, or
RP and A The motor impulse circuit 2300 provides a motor impulse pulse MI when triggered by:

FG and PFS, or
RS, or
CSPL and SG

The return pulse circuit 2100 generates a return pulse signal RP in response to the following signals:
M and CSPL and 2FL and CG, or
CSPL and 1FL and CG The return pulse signal RP triggers the copy counter driver circuit 1800 to provide a CCD signal and triggers the end of copy counter circuit 1850 to provide an end of copy count ECC signal.

The load light circuit 2450 comprises three gates 2452, 2454, 2456 and a transistor 2458, and turns on the load light under the following conditions:
$\overline{PL}$ and 2FL and $\overline{PFS}$ and 8FP (via a gate 2162)

The copy counter 526 is decremented when:
$\overline{CC=0}$ and RP

The carriage release solenoid circuit 1350 is triggered to energize the carriage return solenoid 106 under the following conditions:
A and PFS and MI, or
M and PFS and MI and ECC The carriage rewind motor circuit 1400 is triggered to rewind the carriage by the following:
A and MI and $\overline{2FL}$ and PFS, or
M and MI and $\overline{2FL}$ and PFS and ECC, or
$\overline{PFS}$ and $\overline{PL}$ and $\overline{2FL}$ and $\overline{POR}$ The rewinding is terminated to stop the carriage position motor 64 when the 2FL switch 92 is engaged by the carriage to set the carriage location register circuit 2150 in the 2FL position.

In order to understand the operation of the logic circuitry for the printing machine according to the invention, an example of a typical printing sequence will be discussed. For purposes of this discussion, it will be assumed that the machine is operating in its automatic mode, and differences in operation between this mode and other modes will be explained as necessary. Because of the complexity of the logic circuitry, several sheets of drawings are required, and the interconnections between the drawings are designated by the logical function names (e.g. POR). Interconnections between commonly numbered drawings (e.g. 26a and 26b) are designated by the letters a–u, a'–o' and a'λ'–m''.

When the machine is initially turned on by means of the power switch 502, all of the logic circuitry must be reset to an initial state. This is accomplished by the power on reset circuit 1050 (FIG. 26a) in the following manner. When the power is initially turned on, the voltage present at the collector of a transistor 1052 is substantially at ground potential. Subsequent to turn on, current flows from the 5 V. B+ power supply through a resistor 1054 and a capacitor 1056 to saturate the transistor 1052. Consequently, a zero is applied to the paralleled inputs of a NOR gate 1058 which applies a one to the parallel connected inputs of four NOR gates 1059–1062 which provide zeros to the $\overline{CL1}$, $\overline{CL2}$ and $\overline{CL3}$ outputs (FIG. 26b) for clearing the carriage stepping counter memory circuits 1702 and 1704, the end of copy count test circuit 1850 via monostable multivibrators 1866 and 1868 and the carriage step and reset circuit 2200 of FIGS. 27a, b and 28a, b. The output of the gate 1060 is also applied to a flip-flop 1064, connected as a monostable multivibrator, via a gate 1066 to cause an $\overline{RS}$ pulse to be generated for resetting the circuits 1500 and 2000. A POR input to the gates 1059–1062 from the base machine also serves to generate the reset signals. The $\overline{RS}$ signal is maintained for a time determined by the time constant of a capacitor 1068 and a resistor 1070 connected to the flip-flop 1064. The $\overline{CL1}$, $\overline{CL2}$ and $\overline{CL3}$ signal is maintained until the capacitor 1056 is charged, at which point the current flow into the base of the transistor is terminated and the transistor 1052 is cut off and provides a one at the junction of its collector and resistor 1054. This terminates the $\overline{CL1}$, $\overline{CL2}$ and $\overline{CL3}$ signals.

Figure 25:
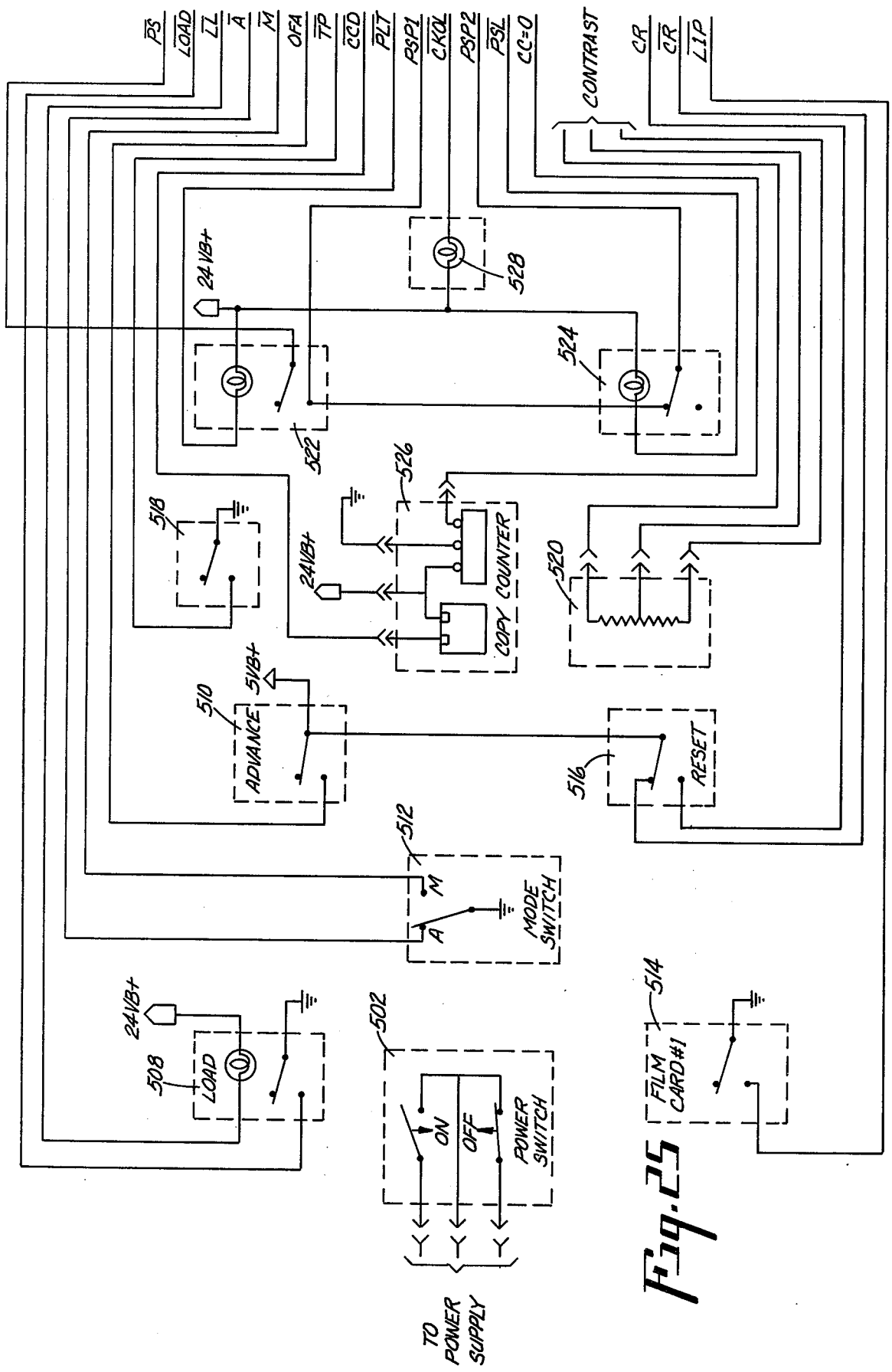
FIG. 25 is a detailed schematic diagram of the control panel illustrated in FIG. 23.

Because the automatic mode of operation has been selected, the $\overline{A}$ input of the mode of operation circuit 1200 is grounded by the mode switch 512 (FIG. 25). This results in a zero being applied to a gate 1202 (FIG. 26a) connected to the $\overline{A}$ input, and a one being applied to a gate 1204 which is connected to a pair of gates 1206 and 1208. The gates 1206 and 1208 functioni as a latch a one at the A output of the gate 1206 when the print latch circuit 1175 (subsequently described) is enabled. Similarly, when the switch 512 is positioned in its manual position, a zero is applied to a gate 1208 which in turn applies a one to a gate 1210 to toggle the latch formed by the gates 1206 and 1208 to provide a one at the M output of the gate 1208 when the print latch circuit 1175 is energized and the switch 512 is in the manual position.

In order to initiate the operation of the machine, the operator closes a load switch 508 (FIG. 25) temporarily to apply a zero to an OR gate 1252 (FIG. 26). If the print latch circuit 1175 is not latched in its printing mode, the OR gate 1252 will provide a zero to the power on reset circuit 1050 through a diode 1254, thereby causing the power on reset circuit 1050 to clear the logic in a manner similar to the clearing that occurred when the AC power was originally turned on. This results in a $\overline{CL1}$ signal being applied to the carriage step circuit to bring the carriage into the last frame position of the No. 2 film card 28 by applying reset pulses to the carriage step circuit 2025 (FIG. 28a) and the paper feed stop circuit 2075 which are connected to the motor impulse circuit 2300 and the carriage step and reset circuit 2200 for resetting the carriage.

After the carriage has been reset, the advance switch 510 (FIG. 25) is depressed to provide an OFA signal to the frame advance circuit 1600 (FIG. 27a). This toggles a latch 1603 formed by a pair of NOR gates 1602 and 1604 so that a one is provided at the output of the gate 1604. The one from the gate 1604 is applied to a NAND gate 1606 which provides a zero output if the $\overline{PL}$ signal applied to its other input is high indicating that the machine is not print latched. This enables the step generator 1525 to begin generating impulses for sequentially stepping the carriage. The stepping continues until the operator sees an image projected on the viewing screen at which point the advance switch 510 is released and the stepping terminated. The number of frames advanced are stored in an initial position counter 1702 within the positioner circuit 1700 (FIG. 27b). This count is later compared with the count in a return position counter 1704 which counts the number of steps taken during the printing cycle so that the carriage may be returned to the same point during the printing cycle.

The number of copies of each frame desired are entered into the copy counter 526 (FIG. 25) which is an electro-mechanical counter that is decremented by electrical pulses applied thereto to reduce the count therein by one for each pulse received. The logic circuitry applies a pulse to the copy counter 526 after each set of copies is made, to decrement the counter, and the printing cycle is repeated until a copy counter 526 has been decremented to zero, at which point the printing cycle is terminated.

After the copy counter has been set to the desired number of copies and the last frame located, the operator may either make a test print by activating the test copy switch 518, or initiate the printing sequence by activating the print switch 522. If the test copy switch 518 is actuated, the $\overline{TP}$ input to the test print circuit 1300 (FIG. 26a) goes low. This causes a one to appear at the output of a gate 1302 which is applied to a monostable multivibrator 1304 that provides a one to a gate 1182 in the print latch circuit 1175 to toggle the latch formed by a pair of gates 1176 and 1178 and initiate the printing sequence. Following the initiation of the printing sequence, a second monostable multivibrator circuit 1306, which was triggered by the $\overline{Q}$ output of the multivibrator 1304, provides a pulse to a gate 1180 in the print latch circuit 1175 to reset the gates 1176 and 1178 and terminate the printing sequence after the test print has been made. The operator may then inspect the test print and if it is of the proper density, he may initiate the automatic printing sequence. If the density is not proper, the contrast control 520 should be adjusted until the proper density is achieved prior to initiating the automatic printing sequence.

When the operator actuates the print switch 522 (FIG. 25) the $\overline{PS}$ input of the print start circuit 1125 (FIG. 26a) goes low. This generates a one at the output of the NOR gate 1126 and causes the latch formed by the gates 1176 and 1178 to toggle and turn the $\overline{PL}$ output true and the PL output false. When the $\overline{PL}$ signal turns false, the gate 1606 (FIG. 27a) is disabled to thereby disable the frame advance circuit 1600 to prevent the operator from further advancing the carriage. For purposes of this discussion, when a circuit has been disabled (or inhibited), it shall mean that subsequent operation of the disabled (or inhibited) circuit by other circuits connected thereto has been prevented. When a circuit has been enabled, subsequent operation by another circuit is permitted.

The $\overline{PL}$ circuit turning false also inhibits a view lamp transistor 2368 in the flip mirror circuit 2350 (FIG. 28b) by disabling a gate 2352. This also prevents the flip mirror 56 from being reset to the viewing position by a multivibrator 2366 via the gate 2352, inverter 2370 and latch 2355. It also effectively disables the carriage reset switch 516 by disabling a gate 1026 in the carriage return circuit 1025 (FIG. 26a) to make the gate 1026 nonresponsive to the toggling of a latch 1029 (comprising gates 1028 and 1030) by the reset switch 516. The operation of the viewing lamp 250 is inhibited by the view lamp inhibit circuit 1625 (FIG. 27a) and the mode of operation switch 512 is effectively inhibited by the output of the gate 1176 of the print latch circuit 1175 applied to the gates 1204 and 1210 of the mode of operation circuit 1200. Similarly, the operation of the load circuit 1250 is inhibited by the output of the gate 1176 applied to the gate 1252. At the same time, the $\overline{PS}$ signal prevents further entry of data into the initial position counter 1502 and is disabled by applying a one (via an inverter 1634) to toggle a latch formed by a pair of gates 1630 and 1632 (FIG. 27a). This disables the gate 1506 (via gate 1628) to prevent the entry of further data into the initial position counter 1702. The $\overline{PSC}$ and $\overline{MCE}$ commands are issued by a gate 1752 (FIG. 27b) of the print command circuit 1750 in response to a PL signal from an inverter 1627.

The above steps serve to initiate the printing sequence. When the printing sequence is initiated, the base machine 2900 feeds paper from a roll to an exposure station. After the paper has been advanced to the exposure station, a cutter gate (not shown) issues a cutter gate pulse CG to initiate the cutting of the paper. This cutter gate pulse is applied to a gate 2108 within the return pulse circuit 2100 (FIG. 28a). The output of the gate 2108 is applied to a gate 2354 connected in a latch circuit 2355 with a gate 2156 within the view lamp and flip mirror circuit 2350 (FIG. 28b). The receipt of the CG signal causes the latch 2355 to change state and to energize a pair of Darlington connected transistors 2358 and 2360 which provide an $\overline{FMS}$ signal for energizing the flip mirror solenoid 63 for moving the flip mirror out of the viewing position and into the reproduction position.

Subsequent to the production of the cutter gate signal, the base machine 2900 provides a flash gate signal FG that activates the xenon flash lamp 252 to expose the paper in the exposure station. The flash gate signal FG is utilized to step the film holder 38 to the next frame position. The FG signal is applied to a gate 2027 within the carriage and step circuit 2025 (FIG. 28a) and thence to a monostable multivibrator 2030 via a NOR gate 2028. The $\overline{Q}$ output of the monostable multivibrator 2030 is applied to the input of another monostable multivibrator 2302 (FIG. 28b) via an inverter 2032 and gates 2076 and 2304, and the monostable multivibrator 2302 provides an $\overline{MI}$ signal at its $\overline{Q}$ output for application to a multivibrator 1527 (FIG. 27a) in the step generator circuit 1525. The $\overline{Q}$ output of the multivibrator 1527 is applied via a gate 1528 to a second multivibrator 1530. The multivibrator 1530 provides an output pulse at its Q output for incrementing the return position counter memory 1704, and an $\overline{SG}$ signal at its $\overline{Q}$ output for application to a gate 2027 within the carriage step circuit 2025 (FIG. 28a). The last mentioned $\overline{SG}$ pulse is applied to a transistor 2202 (FIG. 28b) within the carriage step and reset circuit 2200 via a series of gates 2032, 2204, 2206, 2208 and a pair of inverters 2210 and 2212. As a result, the transistor 2202 generates an $\overline{FAF}$ signal for application to the carriage control circuit 2500 to cause the film holder to be advanced one frame by the stepping motor 110. The Q output of the multivibrator 1530 is also applied to a multivibrator 1534 which resets the frame advance circuit 1600 and temporarily disables the gate 1528.

While the film holder is being advanced, additional paper is being transported into the exposure station of the base machine 2900. After the paper is positioned in the exposure station, the cutter gate issues a CGG command again to apply a pulse to the latch 2355 in the view lamp and flip mirror circuit to assure that the flip mirror solenoid is maintained energized and the flip mirror is out of the viewing position. As in the previous instance, an FG signal is generated by the base machine 2900 to expose the paper in the exposure station following the generation of the CG signal. The FG signal causes the film holder again to advance to the next frame, and the sequence of CG and FG signals generated by the base machine 2900 continues until the film holder limit switch 141 has been activated indicating the film holder has been advanced to the No. 1 frame position. This causes a $\overline{CSPL}$ signal to be applied to a monostable multivibrator 2078 in the paper feed stop circuit 2075 via a NOR gate 2051 connected as an inverting amplifier. The signal from the gate 2051 enables the multivibrator 2078 in the paper feed stop circuit 2075 and also enables a gate 2110 in the return pulse circuit 2100. The next CG pulse following the enabling triggers the multivibrator 2078 through the gate 2108 and an inverter 2080. Upon triggering, the Q output of the multivibrator 2078 goes true (goes high) and the $\overline{Q}$ output goes false (low). The Q output of the multivibrator 2078 enables a gate 2076. The $\overline{Q}$ output generates a $\overline{PFS}$ output to stop the feeding of paper by disabling the gate 1752 (FIG. 27b) to terminate the $\overline{MCE}$ and $\overline{PSC}$ commands. At the same time the $\overline{PFS}$ signal disables the gate 1528 in the step generator circuit 1525 (FIG. 27a) to disable the step generator circuit. The $\overline{PFS}$ signal is also applied to a gate 1128 in the print start circuit 1125 (FIG. 26a) to enable the print latch circuit 1175 to be reset.

When the logic circuitry is enabled as described above, the subsequent FG signal from the machine 2900 triggers the motor impulse circuit 2300 (FIG. 28b) to reset the film holder to the No. 8 frame position. This causes the deactivation of the carriage limit switch 141 and a termination of the $\overline{CSPL}$ signal. In addition, the $\overline{MI}$ signal generated when the motor impulse circuit 2300 is triggered triggers the carriage release solenoid circuit 1350 to generate a $\overline{CS}$ signal to activate the carriage return solenoid 106.

The triggering of the carriage release solenoid circuit 106 causes the two film limit switch 92 to be deactivated and causes the one film limit switch 107 to be activated. This causes the $\overline{2FL}$ signal to turn true and the $\overline{1FL}$ signal to turn false. The $\overline{2FL}$ signal is applied to the latch 2157 of the carriage location return circuit 2150 (FIG. 28a) through a gate 2160 and causes the latch 2157 to toggle to indicate that the carriage 44 is in the one film position.

After a period of time determined by the time constant of a capacitor 2080 and a resistor 2082 connected to the multivibrator 2078, the paper feed stop circuit 2075 times out and the Q output of the multivibrator 2078 goes low and the $\overline{Q}$ output goes high. This disables the motor impulse circuit 2300. At the same time, the $\overline{Q}$ output again enables the gate 1752 to generate the $\overline{MCE}$ and the $\overline{PSC}$ commands. At the same time, the $\overline{PFS}$ signal disables the carriage release solenoid circuit and enables the step generator circuit 1525.

The generation of the $\overline{MCE}$ and $\overline{PSC}$ commands causes the machine to resume making copies, and CG and FG pulses are generated by the base machine 2900 during the copy making process, as previously described. The alternating FG and CG pulses cause the motor 110 to continue advancing the film holder frame by frame until the carriage stop limit switch 141 is again activated. When the limit switch 141 is again activated the $\overline{CSPL}$ signal is again generated to enable the paper feed stop circuit 2075 and the return pulse circuit 2100. As previously described, the subsequent CG pulse triggers the paper feed stop circuit 2075 thereby enabling the motor impulse circuit 2300 and the possibility of carriage rewind motor actuation. Similarly, the $\overline{Q}$ output of the multivibrator 2078 disables the $\overline{MCE}$ command and turns the $\overline{PSC}$ command false. The step generator circuit 1525 is disabled and the reset of the print latch circuit 1175 is enabled. The carriage release solenoid circuit 1350 is also enabled.

The CG signal also triggers the return pulse circuit 2100 which has been enabled by the $\overline{1FL}$ signal applied to a gate 2112 via a gate 2114. The $\overline{RP}$ signal from the return pulse circuit 2100 is applied to the memory erase circuit 1650 via an inverter 1852 and a gate 1854 which was enabled by the A signal from the mode of operation switch 512. This causes the return position counter memory 1704 to be erased in preparation for the next stepping sequence, and causes the PR output of the positioner circuit 1700 to turn false. At the same time, the $\overline{RP}$ signal is applied to the end of copy counter test circuit 1850 (FIG. 27b) to set a latch 1855 consisting of gates 1854 and 1856 to test for the end of copy count CC=0. If the copy count is not zero ($\overline{CC=0}$ is true), then the $\overline{RP}$ signal is applied to a multivibrator 1804 via a gate 1802. The output of the multivibrator 1804 energizes a pair of Darlington connected transistors 1806 and 1808 to provide a $\overline{CCD}$ pulse to decrement the copy counter 526 one unit. The duration of the $\overline{CCD}$ signal is determined by the time constant of a resistor 1810 and a capacitor 1812 connected to the multivibrator 1804.

The next flash gate signal FG again triggers the motor impulse circuit to cause the holder to be reset to the No. 8 frame position, as previously described, and triggers the carriage return solenoid; however, the triggering of the carriage return solenoid has no effect on the position of the carriage because the carriage is already positioned in the No. 1 film card position. In this instance, the $\overline{MI}$ pulse triggers the carriage motor rewind circuit 1400 (FIG. 26b). The $\overline{MI}$ pulse is applied to the carriage rewind motor circuit 1400 through an inverter 1402 and a pair of gates 1404 and 1406. The $\overline{MI}$ pulse causes triggering of the carriage rewind motor circuit 1400 because the motor circuit 1400 had been previously enabled by the $\overline{2FL}$ signal applied to a gate 1408. This toggles a latch 1411 comprising a pair of NOR gates 1410 and 1412 and applies a high output to a Darlington connected transistor pair comprising two transistors 1414 and 1416. The high output causes the transistors 1414 and 1416 to conduct and provide a $\overline{CRMC}$ signal to the carriage motor clutch 68 in the circuit 2500 (FIG. 9) to engage the clutch 68. Simultaneously, the low output from the gate 1412 is inverted by a gate 1418 and applied to a transistor 1420 to energize the transistor 1420 and provide a $\overline{CRM}$ signal to the circuit 2500 to energize the carriage position motor 64 to thereby return the carriage to the No. 2 film card position.

As the carriage is returned to the No. 2 film card position, the limit switch 107 (FIG. 5) is deactivated and the switch 92 is activated to turn the $\overline{1FL}$ signal true and the $\overline{2FL}$ signal false. This toggles the latch 2157 in the carriage location register circuit 2150 and disables the gate 1408 in the carriage rewind motor circuit 1400 to terminate the carriage rewinding operation.

After the paper feed stop circuit 2075 (FIG. 28a) times out, the motor impulse circuit 2300 (FIG. 28b) and the carriage rewind motor circuit are again disabled and the print command circuit 1750 (FIG. 27b) is again disabled. The carriage release solenoid circuit 1350 is also disabled and the latch 1855 in the end of copy count test circuit 1850 is toggled to disable the end of copy count test and render the $\overline{ECC}$ output true.

At this point, the positioner circuit 1700 compares the contents of the return position counter memory 1704 and the initial position counter memory 1702 to determine whether the carriage is in its ready position. The comparison is made by three exclusive OR gates 1706, 1708 and 1710, a pair of NOR gates 1712 and 1714 and an inverter 1716. If the contents of the memories 1702 and 1704 are equal, then the outputs of the exclusive OR gates 1706, 1708 and 1710 are zeroes and the output signal PR of the gate 1714 is a one. This enbales the gate 1752 in the print command circuit 1750 to generate the multiple copy enable and the print start command by turning the $\overline{\text{MCE}}$ and the $\overline{\text{PSC}}$ signals false. Simultaneously, the PR signal from the gate 1714 is applied to a gate 1732 in the step generator circuit 1525 to disable the operation of the step generator circuit 1525. At this point, the holder will be stepped frame by frame as previously described to generate another set of copies.

If the positioner circuit 1700 is not ready, as indicated by a difference in the counts stored in the memories 1702 and 1704, the PR output of the gate 1714 will be low, and disable the gate 1752 in the print command circuit 1750. The step generator circuit 1725 is enabled and the holder 38 is stepped frame by frame until the counts in the memories 1702 and 1704 are equal, at which point the PR output of the gate 1714 turns true to disable the step generator circuit 1525 and enable the print command circuit 1750.

The machine then sequentially proceeds to make copies in a frame by frame fashion until the No. 1 film card limit switch 141 is actuated to enable the paper feed stop circuit 2075 and the return pulse circuit 2100 as previously described. The subsequent cutter gate pulse CG triggers the paper feed stop circuit 2075 to enable the motor impulse circuit 2300, disable the print command circuit 1750, enable the carriage release solenoid circuit 1350, disable the step generator circuit 1525 and enable the reset of the print latch circuit 1175.

The CG signal also triggers the return pulse circuit 2100 to apply an $\overline{\text{RP}}$ signal to the gate 1802 in the copy counter driver circuit 1800 to decrement the counter 526 if it is not already zero. If it has already been decremented to zero, the counter 526 will provide a false $\overline{\text{CC}=0}$ signal to a NAND gate 1858 in the end of copy count test circuit 1850 via a NOR gate 1860 connected as an inverter, a resistor 1862 and a diode 1864. The false $\overline{\text{CC}=0}$ signal enables the end of copy count test circuit 1850 so that the $\overline{\text{ECC}}$ output of the gate 1858 goes false upon receipt of an $\overline{\text{RP}}$ signal by the inverter 1852. The false $\overline{\text{ECC}}$ signal is applied to a gate 1652 (which was enabled by a false $\overline{\text{RS}}$ signal) via an inverter 1654 and a gate 1656, and causes the initial position counter memory 1702 to be erased. The return position counter memory 1704 is erased by an output from a gate 1662 in a similar manner. The erasing of both of the memories 1702 and 1704 causes the PR output (position ready) of the gate 1714 to turn true.

The generation of the $\overline{\text{ECC}}$ signal also enables the carriage release solenoid circuit 1350 (FIG. 26b) for subsequent triggering of a monostable multivibrator 1358 and transistors 1360 and 1362 by the carriage release circuit 1275 (via a gate 1364) by enabling a gate 1352 via an inverter 1354. The carriage rewind motor circuit 1400 is similarly enabled by the output of the gate 1354 which enables a gate 1422 in the circuit 1400. Similarly, the print latch circuit 1175 is toggled by the $\overline{\text{ECC}}$ signal applied to the gate 1180 in the print latch circuit 1175 to turn the $\overline{\text{PL}}$ signal true. The switching of the $\overline{\text{PL}}$ signal to true disables the gate 1752 of the print command circuit 1750 to disable the multiple copy enable and the print start command by turning the $\overline{\text{MCE}}$ and $\overline{\text{PSC}}$ signals true. The mode of operation circuit 1200 and the load circuit 1250 are enabled by the PL signal from the gate 1176 when the PL signal goes false. The initial position start counter 1702 is enabled for further entry by the enabling of the gate 1506, and the view lamp inhibit circuit 1625 is enabled by the true $\overline{\text{PL}}$ applied to the gate 1628. The carriage return switch circuit 1025 is enabled by the $\overline{\text{PL}}$ output of the print latch circuit 1175 as is the view lamp and flip mirror circuit 2350 wherein the gate 2352 is enabled by the $\overline{\text{PL}}$ signal applied to one of its inputs by means of two inverters 2362 and 2364. The operator frame advance circuit 1600 is similarly enabled by the $\overline{\text{PL}}$ signal applied to the gate 1606.

The last flash gate signal FG exposes the last copy to be made and simultaneously triggers the motor impulse circuit 2300. This causes the stepping motor 110 to release the holder 38 to reset the holder to the eighth frame position and to deactivate the No. 1 frame position limit switch 141. At the same time, the carriage release solenoid circuit 1350 is triggered by the $\overline{\text{MI}}$ signal applied to a gate 1354. This has no effect on the position of the carriage because the carriage is already positioned in the No. 1 film card position; however, the carriage rewind motor circuit 1400 is also triggered by the $\overline{\text{MI}}$ pulse to cause the carriage to be rewound by the motor 64 to the No. 2 film card position. The movement of the carraige to the No. 2 film card position deactivates the one film limit switch 107 and actuates the two film limit switch 92 to toggle the carriage location register circuit 2150 and terminate the rewinding of the carriage by toggling the latch 1411 in the carriage rewind motor circuit 1400 as previously described. At this point, the film holder has been returned to the No. 8 frame of the No. 2 film card and is ready for the next printing operation.

The paper feed stop circuit 2075 now times out and disables the motor impulse circuit 2300 from operation by FG signals from the flash gate and disables the carriage rewind motor circuit by means of the $\overline{\text{PFS}}$ signal applied to the gate 1404 through the inverter 1424. The gate 1752 is enabled by the $\overline{\text{PFS}}$ circuit to generate the multiple copy enable and the print start command signals $\overline{\text{MCE}}$ and $\overline{\text{PSC}}$ wherever a subsequent print start signal toggles the print latch circuit 1175 into the print latch mode. The carriage release solenoid circuit 1350 is disabled by the $\overline{\text{PFS}}$ signal applied to the gate 1354 and the step generator circuit 1525 is enabled by the $\overline{\text{PFS}}$ signal applied to the gate 1528. The latch 1855 and the end of copy count test circuit 1850 is toggled to turn the $\overline{\text{ECC}}$ signal true. The flip mirror is released and the view lamp is turned on by the view lamp and flip mirror circuit 2350 by the turning true of the $\overline{\text{PL}}$ signal, and the machine is ready for the next cycle.

The operating sequence described in the foregoing occurs when the machine is programmed in the automatic mode. In the automatic mode, the machine sequentially reproduces the frames on two film cards, beginning with a predetermined frame on the No. 2 film card that is determined by advancing the No. 2 film card through the machine until the predetermined frame is viewed. Upon depression of the print start button, the printing sequence is initiated and the machine steps in a frame by frame fashion through the remainder of the images on the No. 2 film card and all of the images on the No. 1 film card. After the No. 1 frame on the No. 1 film card has been printed, the machine returns to the predetermined frame on the No. 2 film card and repeats the printing cycle until the number of copies that have been entered into the copy counter 526 have been generated.

The machine is also operable in two manual modes, a one card manual mode and a two card manual mode. In both manual modes, the stepping sequence begins at a predetermined frame determined by advancing the film holder 38 with the advancing switch 510 until the predetermined frame is located in the optical path. Upon depression of the print start switch 522, the machine sequentially prints copies of the remaining frames on the film card in the veiwing path.

The major difference between automatic and manual operation, is that after the No. 1 frame in the film card in the viewing path has been printed, the holder is returned to the predetermined starting frame on the same film card, rather than being stepped through the second film card. The sequence is repeated until the number of copies entered into the copy counter 526 have been made, at which point, the printing sequence is terminated. After the termination of the printing sequence, if the carriage is in the No. 2 film card position, the carriage release solenoid is activated to bring the No. 1 film card into the optical path and the holder is rewound to the No. 8 frame position. This permits copies of the images disposed on the No. 1 film card location to be made upon depression of the print start button 522. If the carriage is in the No. 1 film card position, the carriage and film holder are returned to the No. 8 frame of the No. 2 film card to permit the copying of the No. 2 film card.

The single film card stepping sequence is generated by the mode of operation circuit 1200 which is controlled by the mode switch 512. When the manual mode is selected, the mode of operation circuit 1200 generates a true M signal and a false A signal. These signals are applied to a gate 1356 and the gate 1352 in the carriage solenoid release circuit 1350, and to a gate 1424 and the gate 1422 in the carriage rewind motor circuit 1400. This inhibits the carriage release solenoid circuit 1350 to prevent the circuit 1350 from being triggered by an $\overline{MI}$ or a $\overline{PFS}$ signal until the copy counter 526 has been decremented to zero. This prevents a different film card from being brought into the optical path until after the printing sequence has been finished. The two film limit switch 92 provides the $\overline{2FL}$ signal to the gate 1408 in the carriage motor rewind circuit to cause the carriage position motor 64 to be activated to bring the No. 1 film card into position and after the completion of the printing sequence of the images disposed on the No. 2 film card.

Figure 30:
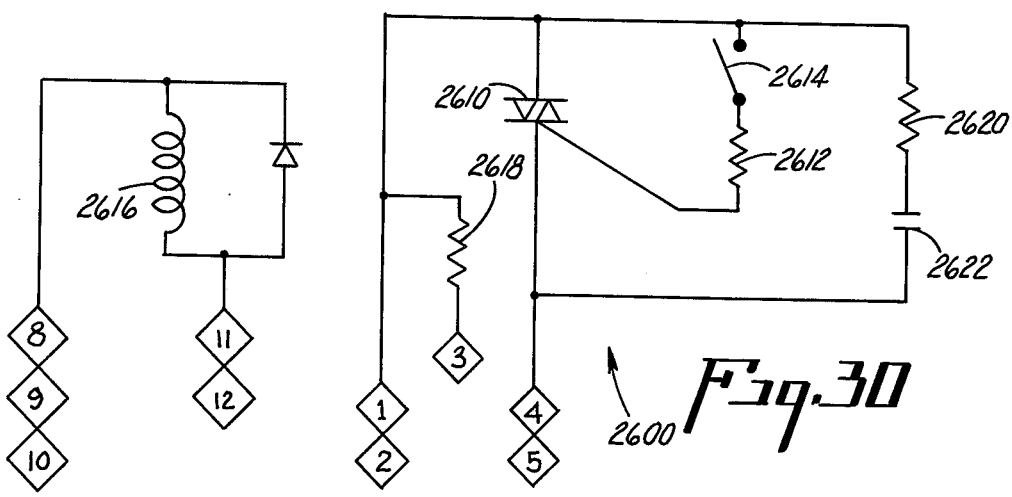
FIG. 30 is a detailed schematic diagram of one of the carriage control circuits of FIG. 29.

The control circuits for energizing the various motors for transporting the carriage 44 and the film card holder 38 are shown in FIG. 29. The carriage position motor 64 and the stepping motor 110 are selectively energized by three thyristor control circuits each designated by the reference numeral 2600. One of the thyristor control circuits 2600 is illustrated in FIG. 30. Each of the control circuits 2600 includes a thyristor, in this embodiment a triac 2610 having main electrodes and a control electrode. The main electrodes of the triac 2610 are each connected to a pair of terminals labelled 1, 2 and 4, 5, respectively, of the control circuit 2600.

The gate electrode of the triac 2610 is connected in a series circuit with one of the main electrodes of the triac 2610, a resistor 2612 and a set of normally open relay contacts 2614. The relay contacts 2614 are magnetically coupled to a relay coil 2616 and are closed to complete the circuit between one of the main electrodes and the gate electrode of the triac 2610, to render the triac 2610 conductive.

One terminal of the relay coil 2616 is connected to three output terminals 8, 9 and 10, and the other end of the coil 2616 is connected to a pair of terminals 11 and 12. The relay coil 2616 is energized by applying an electrical potential to any two of the terminals connected to opposite terminals of the coil 2616. One of the mian electrodes of the triac 2610 is also connected to an output terminal 3 of the circuit 2600 through a resistor 2618. The function of the output terminal 3 and the resistor 2618 will be described in a subsequent portion of the detailed description. A resistor 2620 and a capacitor 2622 connected across the main terminals of the triac 2610 serve to protect the triac 2610 from voltage transients.

The carriage position motor 64 is controlled by a thyristor control circuit 2502. One terminal of the carriage position motor 64 is connected directly to the ACI side of the alternating current power line and the other terminal is connected to the terminal 1 of the circuit 2502. The terminal 5 of the circuit 2502 is connected to the ACII side of the power line through the common terminals 4 and 5 of the circuits 2504 and 2506. The terminal 10 of the circuit 2502 is connected to the 5V B+ source through the terminals 8 and 10 of the circuits 2504 and 2506. The terminal 12 of the circuit 2502 is connected to the $\overline{CRM}$ output of the carriage rewind motor circuit 1400. As a result, when an active low output is present at the $\overline{CRM}$ output of the carriage rewind motor circuit 1400, the current path between the 5V B+ supply and ground is completed through the relay coil 2616 thereby closing the contacts 2614 and rendering the triac 2610 conductive to energize the carriage position motor 64 to move the carriage into the No. 2 film card position. The $\overline{CRMC}$ signal goes to its low active state simultaneously with the $\overline{CRM}$ signal and energizes the carriage motor clutch 68 to cause the carriage to be engaged by the output shaft of the motor 64. This action continues until the number two film card limit switch 92 is activated and the $\overline{CRM}$ and the $\overline{CRMC}$ signals return to their high inactive states to terminate the operation of the carriage position motor 64 and the carriage motor clutch 68.

The frame to frame fore/aft motion of the film card holder 38 is controlled by the stepping motor 110. The stepping motor 110 works against the torque provided by the preloading motor 112 which is connected directly across the ACI and ACII terminals of the power line and is continuously energized.

The stepping motor 110 contains a pair of windings adapted to rotate the stepping motor output shaft in a first direction when the windings are energized in a first relative phase, and to rotate the motor output shaft in a reverse direction when the windings are energized in the opposite relative phase.

Each of the windings is connected at one end to the ACI side of the power line by a pair of leads 2508 and 2510. The other ends of the two windings are connected to the terminals 1 of the circuits 2504 and 2506 by a pair of leads 2512 and 2514, respectively.

In order to step the stepping motor 110 in the forward direction, the triac 2610 in the circuit 2504 is rendered conductive. This serves to apply power from the ACII side of the power line to the lead 2512. In addition, power is applied from the ACII side of the power line to the lead 2514 through the resistor 2618 and a phase shifting capacitor 2516 via the commonly connected terminals 1 and 2 of the circuit 2506. The capacitance of the capacitor 2516 is selected so that the current flowing into the lead 2514 leads the current flowing into the lead 2512 to thereby cause the stepping motor 110 to step in the forward direction.

Stepping of the motor in the reverse direction is achieved by rendering the triac 2610 in the circuit 2506 conductive to apply power from the ACII side of the power line directly to the lead 2514 and to the lead 2512 through the capacitor 2516 and the resistor 2618 in the circuit 2504. Under such conditions, the current flowing through the lead 2512 leads the current flowing through the lead 2514 thereby causing the shaft of the motor 110 to be stepped in the reverse direction.

The stepping motor 110 is stepped in the forward direction by the carriage step and reset circuit 2200 in the following manner. Initially, upon receipt of a motor impulse signal $\overline{MI}$, the carriage step and reset circuit 2200 (FIG. 28b) generates a low active state $\overline{FAF}$ impulse that is applied to the terminal 12 of the circuit 2504. This energizes the relay coil 2616 in the circuit 2504 and renders the triac 2610 in that circuit conductive to rotate the shaft of the motor 110 in the forward direction. As the shaft is rotated, the cam 114 (FIG. 7) closes the cam switch 138. This completes the circuit between the normally low FACS output of the carriage step and reset circuit 2200 and the terminal 11 of the circuit 2504. As a result, the relay coil 2616 is maintained energized by the FACS signal and the motor 1100 continues to rotate until the cam has been rotated 180° at which point the switch 138 is opened by one of the depressions 142 in the cam 114. This terminates the operation of the stepping motor 110 until the next $\overline{FAF}$ signal is received.

Reverse operation of the stepping motor 112 is achieved when the carriage step and reset circuit 2200 provides a low active state $\overline{FAR}$ signal to the input terminal (12) of the circuit 2506. The duration of the low active state $\overline{FAR}$ signal is determined by the time constant of the resistor-capacitor network connected to the Q and R terminals of a monostable multivibrator 2212 which drives a pair of transistors 2214 and 2216 via a pair of NAND gates 2218 and 2220, connected as inverters, respectively. This energizes the relay coil 2616 and the triac 2610 in the circuit 2506 for the duration of the low active $\overline{FAR}$ pulse. As in the case of forward rotation, the reverse rotation of the stepping motor 110 causes the cam 114 to close the switch 138 so that upon the termination of the low active state $\overline{FAR}$ signal, the FACS signal may be applied to the terminal 11 of the circuit 2504. Typically, the low active state $\overline{FAR}$ signal has a relatively short duration designed to provide sufficient reverse rotation to disengage one of the pins 116 from its respective notch 124 in the rack 118. Following the termination of the low active state $\overline{FAR}$ signal, and the disengagement of one of the pins 116 from the rack 118, the FACS signal (which is the complement of the $\overline{FAR}$ signal) goes low to step the motor 110 again in the forward direction. This releases the other one of the pins 116 from the rack 118 and permits the holder to be returned to the No. 8 frame position by the continuously energized preloading motor 112. The return operation just described is similar to the return operation described in greater detail in the referenced Goebel patent.

Figure 31:
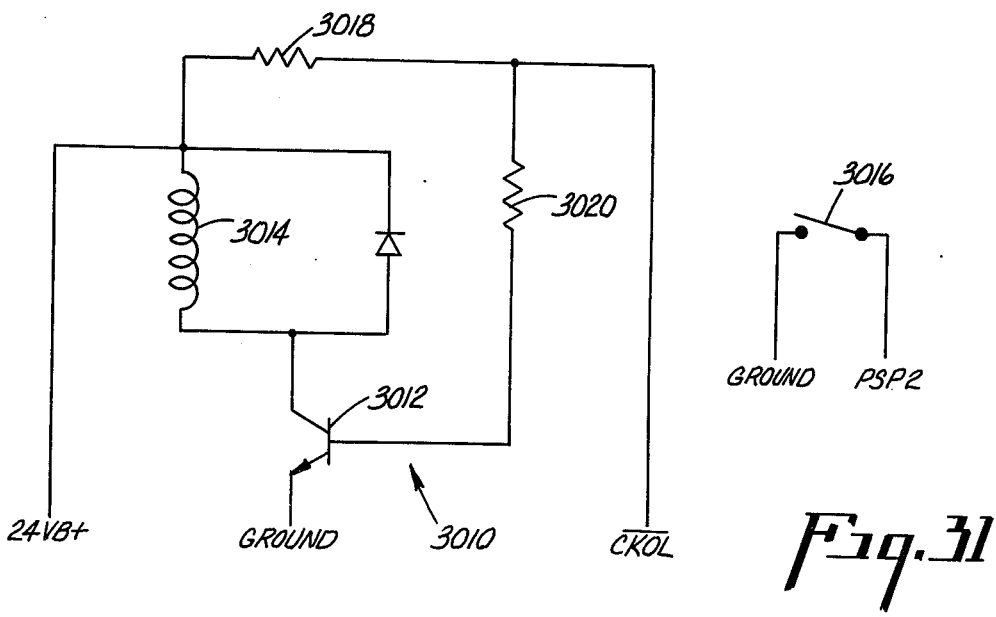
FIG. 31 is a detailed schematic diagram of a circuit for inhibiting the operation of the control panel print switch when the machine is operating in its printing mode.

Finally, referring to FIG. 31, there is shown a print switch inhibit circuit 3010 which inhibits the printing of any copies in the event of a malfunction in the base machine 2900. The circuit 3010 comprises a transistor 3012 which drives a relay coil 2014 that operates a switch contact member 3016. Under normal operating conditions, a pair of biasing resistors 3018 and 3020 apply a forward biasing potential from the 24V B+ source to the base of the transistor 3012 to maintain the transistor 3012 conductive and the relay coil 3014 energized. This causes the contact member 3016 to ground the PSP2 signal. Upon receipt of a low active state $\overline{CKOL}$ signal, indicative of a machine malfunction, the transistor 3012 is rendered nonconductive, thereby deenergizing the relay coil 3014 and opening the switch member 3016 to permit the PSP2 signal to go high to stop the printing sequence. At the same time, the call key operator light 528 (FIG. 25) is energized to indicate that a malfunction has occurred.

Thus a new and improved machine for selectively displaying or automatically reproducing micro-images has been provided. Obviously many modifications and variations of the present invention are possible in light of the above teachings. Therefore, it is to be understood that, within the scope of the appended claims, the invention may be practiced otherwise than an specifically described above.

What is claimed and desired to be secured by Letters Patent of the United States is:

1. Apparatus having means for displaying and reproducing micro-images disposed on film cards, comprising:
   means for projecting said micro-images onto said displaying and reproducing means;
   a film card holder having first and second sections for receiving first and second film cards;
   means for transporting said film card holder through said projecting means; and
   means for controlling the operation of said transporting means in a predetermined manner, said controlling means having a first mode of operation effective to cause said transporting means alternately to transport said first and second sections through said projecting means a predetermined number of times, and a second mode of operation effective to cause said transporting means to transport a single one of said sections through said projecting means a predetermined number of times.

2. Apparatus as recited in claim 1 wherein said transporting means includes means for incrementally stepping each of said first and second sections through said projecting means in a predetermined number of fixed increments, said fixed increments corresponding to the distance between successive ones of the micro-images disposed on said film cards, said incremental stepping means thereby being effective successively to position each one of the micro-images within said projecting means for projection thereby.

3. Apparatus as recited in claim 2 wherein said controlling means includes manually operable means for advancing said stepping means a variable number of said fixed increments, means for counting the variable number of increments, means for sequentially advancing said stepping means the rest of said predetermined number of said fixed increments thereby successively to position each of the micro-images corresponding to the rest of said predetermined increments in said projecting means for reproduction by said reproducing means, means for automatically returning said film holder to a predetermined position subsequent to the automatic stepping of said stepping means, and means responsive to said increment counting means for automatically advancing said stepping means a number of increments equal to the variable number of increments stored in the counting means.

4. Apparatus as recited in claim 3 further including manually settable counting means having means for storing numbers manually entered therein, said sequential stepping means and said automatic stepping means being responsive to said manually settable counting means sequentially to position each of said corresponding micro-images in said projecting means a predetermined number of times equal to said manually entered number.

5. Apparatus as recited in claim 4 wherein said increment counting means includes a first memory responsive to the manual advancement of said stepping means for counting the variable number of manually advanced increments, second memory means for counting the number of increments said stepping means is advanced by said automatic stepping means, and means for comparing the counts in the first and second memory means.

6. Apparatus as recited in claim 5 wherein said manually settable counter includes a decrementable counter responsive to said sequential advancing means, said decrementable counter being decremented by one unit following each advancement of said stepping means by said predetermined number of increments, said decrementable counter being operative to terminate the advancement of said stepping means upon being decremented to zero.

7. Apparatus as recited in claim 6 further including manually operable means for selectively positioning one of said first and second sections in said projecting means.

8. Apparatus as recited in claim 7 further including manually operable means for selecting the mode of operation of said controlling means.

9. Apparatus as recited in claim 1 wherein said film card holder comprises a frame having defined therein first and second apertures for receiving first and second film cards; first and second transparent upper plates disposed over said first and second apertures, respectively; first and second transparent lower plates disposed adjacent to said first and second transparent upper plates within said first and second apertures, respectively; means supporting said transparent lower plates within said apertures, said supporting means being operable to a first position to bring together the adjacent surfaces of said upper and lower plates to a second position to separate said upper and lower plates to permit the insertion of film cards therebetween; and manually operable means affixed to said frame for selectively moving said supporting means to one of said first and second positions.

10. Apparatus as recited in claim 9 wherein said lower plates are pivotably mounted to said supporting means and resiliently biased toward said upper plates, and said supporting means include means for limiting the maximum amount of pivoting of said lower plates to an amount insufficient to permit contact between the upper and lower plates when the supporting means is operated in its second position.

11. Apparatus as recited in claim 10 wherein said frame includes means for supporting said upper plates along the edges of the surfaces adjacent said lower plates.

12. Apparatus as recited in claim 11 further including resiliently biased members attached to said frame for engaging and resiliently urging said upper plates against said upper plate supporting means.

13. Apparatus as recited in claim 12 wherein said upper plates are slidably mounted to said frame, said film card holder further including means for disengaging said resiliently biased members from said upper plates to permit the upper plates to be slidably removed from said frame.

14. Apparatus as recited in claim 9 further including means attached to said film card holder for manually adjusting the position thereof with respect to said projecting means to thereby center one of said micro-images within said projecting means.

15. Apparatus as recited in claim 14 further including a carriage for supporting said film card holder, said film card holder being mounted for linear movement with respect to said carriage; an elongated splined shaft rotatably mounted to said carriage with its axis of elongation parallel to the direction of linear movement of said film card holder, said splined shaft being further positioned for engaging said manual adjusting means over the entire range of linear movement of said film card holder; and a manually rotatable knob member affixed to one end of said splined shaft, the rotation of said knob member being effective to rotate said splined shaft to thereby effect the adjustment of said film card holder.

16. Apparatus as recited in claim 15 wherein said carriage is mounted for linear movement with respect to said projecting means in a direction perpendicular to the direction of linear movement of said film card holder, the linear movement of said carriage being effective selectively to bring one of said first and second sections of said film card holder into alignment with said projecting means.

17. Circuitry for advancing a film card holder having two sections for transporting two respective film cards, each having a predetermined number of micro-images disposed thereon, through the optical path of a viewer-printer machine comprising:

first manually operable counter means responsive to numbers entered therein for determining the number of copies of each micro-image to be printed;

manually operable circuit means for positioning a predetermined initial one of said micro-images in the optical path of said machine;

second counter means responsive to said manually operable circuit means for storing a count indicative of the position of said predetermined initial one of said micro-images;

stepping means for sequentially positioning each of said micro-images following said initial micro-image in said optical path in a predetermined sequence for reproduction by said machine;

means responsive to the position of said film card holder and to said second counter means for returning said holder to said initial position;

means operatively coupled to said stepping means and responsive to the count in said first manually operable counter for rendering said stepping means operative sequentially to position each of said micro-images in said optical path a number of times equal in number to the number entered in said first counter; and manually operable means for altering said predetermined sequence between first and second modes, said first mode being effective sequentially to step the micro-images disposed on a single one of said film cards through said optical path and said second mode being effective sequentially to step the micro-images disposed on both of said film cards through said optical path.

18. Circuitry as recited in claim 17 wherein said manually operable circuit means includes means responsive to the manual operation of said manually operable circuit means for repositioning said film cards in said optical path to position a different predetermined initial one of said micro-images in said optical path.

19. Circuitry as recited in claim 17 further including manually operable means for making a single copy of the micro-image aligned in the optical path at the time of actuation of said single copy making means.

20. Apparatus for displaying and reproducing micro-images disposed on film cards, comprising:

means for projecting said micro-images for display and reproduction;

a film card holder for receiving film cards; and means for transporting said film card holder through said projecting means, said transporting means including a first electric motor, means mechanically coupling said first electric motor to said film card holder for transporting said film card holder in a first predetermined direction, a second electric motor and means mechanically coupling said second electric motor to said holder for transporting said holder in a second direction opposite said first predetermined direction, said second electric motor being operative to exert a preloading force on said holder in a direction opposite the force provided by said second motor.

21. Apparatus as recited in claim 20 wherein said first electric motor coupling means includes means for incrementally stepping said motor in predetermined increments.

22. Apparatus as recited in claim 20 wherein said second electric motor coupling means includes a substantially constant torque clutch interposed between said second electric motor and said holder.

23. Apparatus as recited in claim 22 wherein said substantially constant torque clutch is a spring clutch.

24. Apparatus as recited in claim 20 further including a third electric motor, means coupling said third electric motor to said holder for transporting said holder in a third predetermined direction having a component perpendicular to said first and second predetermined directions, a fourth motor and means coupling said fourth motor to said holder for transporting said holder in a fourth direction opposite said third direction.

25. Apparatus as recited in claim 24 wherein said fourth motor is a spring motor operatively coupled to said holder in a predetermined manner to be wound by the displacement of said holder in the third direction, said fourth motor being operative to transport said holder in said fourth direction upon the unwinding thereof.

26. Apparatus as recited in claim 25 further including means for latching said holder at a predetermined point upon said holder being transported in said third direction to said predetermined point, said latching means being effective to maintain said fourth motor in a wound condition.

27. Apparatus as recited in claim 26 further including means coupled to said latching means for releasing said holder, said releasing means being effective to permit said fourth motor to transport said holder to said fourth direction.

28. Apparatus as recited in claim 27 wherein said releasing means includes an electro-mechanical solenoid.

29. Apparatus as recited in claim 24 wherein said third electric motor coupling means includes a clutch interposed between said third electric motor and said holder.

30. Apparatus as recited in claim 29 wherein said clutch coupling said third electric motor to said holder includes an electro-mechanical clutch operatively coupled to said third electric motor for mechanically coupling said third electric motor to said holder when said third electric motor is energized and for disengaging said third electric motor from said holder when said electric motor is deenergized.

31. Apparatus as recited in claim 20 wherein said apparatus includes image reproducing means and a display area and said projecting means includes means movable to a first and a second position for selectively projecting said micro-images onto said display area and said reproducing means, respectively; and means responsive to the operation of said reproducing means for automatically moving said selective projecting means to said second position.

32. Apparatus as recited in claim 31 wherein said selective projecting means includes a movable reflective surface and an electro-mechanical solenoid mechanically coupled to said reflecting surface and electrically coupled to said reproducing means, said electro-mechanical solenoid being operative to move said reflecting surface to said second position in response to an electrical signal from said reproducing means.

33. Apparatus as recited in claim 32 further including means for returning said reflective surface to said first position upon the termination of operation of said reproducing means.

34. Apparatus as recited in claim 20 wherein said projecting means includes a first light source for providing illumination for displaying said micro-images and a second light source for providing illumination for reproducing said micro-images, and means for supporting said first and second light sources, said supporting means including means for simultaneously adjusting the position of both of said first and second light sources in three mutually perpendicular directions, and means for independently adjusting the position of a single one of said first and second light sources in two mutually perpendicular directions.

35. Apparatus as recited in claim 34 wherein said one of said first and second light sources is said second source.

* * * * *